(12) United States Patent
Nakamura

(10) Patent No.: US 7,880,839 B2
(45) Date of Patent: Feb. 1, 2011

(54) LIQUID CRYSTAL DISPLAY

(75) Inventor: Shun Nakamura, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 393 days.

(21) Appl. No.: 12/058,266

(22) Filed: Mar. 28, 2008

(65) Prior Publication Data

US 2008/0239212 A1  Oct. 2, 2008

(30) Foreign Application Priority Data

Mar. 30, 2007  (JP)  ............................. 2007-094843

(51) Int. Cl.
*G02F 1/1335* (2006.01)

(52) U.S. Cl. .................... 349/118; 349/96; 349/119

(58) Field of Classification Search ......... 349/117–119, 349/96–98
See application file for complete search history.

(56) References Cited

U.S. PATENT DOCUMENTS

| 4,583,825 | A | 4/1986 | Buzak |
| 5,410,422 | A | 4/1995 | Bos |
| 5,583,679 | A | 12/1996 | Ito et al. |
| 5,646,703 | A | 7/1997 | Kamada et al. |
| 6,628,359 | B1 | 9/2003 | Terashita et al. |
| 6,717,645 | B2 * | 4/2004 | Shimoshikiryou et al. .. 349/141 |
| 7,541,074 | B2 * | 6/2009 | Nakayama et al. ........... 428/1.3 |
| 7,586,569 | B2 * | 9/2009 | Yano et al. .................. 349/117 |
| 2003/0218709 | A1 | 11/2003 | Ito et al. |
| 2009/0122243 | A1 * | 5/2009 | Sugiyama et al. ........... 349/118 |

FOREIGN PATENT DOCUMENTS

| DE | 39 11 620 A1 | 10/1990 |
| EP | 1300701 A1 | 4/2003 |
| JP | 6-214116 A | 8/1994 |
| JP | 9-197397 A | 7/1997 |
| JP | 9-211444 A | 8/1997 |
| JP | 11-316378 A | 11/1999 |
| JP | 3056997 B2 | 4/2000 |
| JP | 2002-40429 A | 2/2002 |
| JP | 2006-243179 A | 9/2006 |
| WO | WO 96/37804 A1 | 11/1996 |

* cited by examiner

*Primary Examiner*—Dung T. Nguyen
(74) *Attorney, Agent, or Firm*—Buchanan Ingersoll & Rooney PC

(57) ABSTRACT

There is provided a liquid crystal display which includes: a liquid crystal cell containing a pair of transparent substrates and a liquid crystal layer containing liquid crystal molecules, sandwiched between the pair of the transparent substrates; and a polarizing plate, disposed on an outside of each transparent plate, and comprising at least a polarizer and an optical film containing at least first, second and third optical anisotropic layers, wherein the liquid crystal display device satisfies the following conditions (1) to (7).

8 Claims, 1 Drawing Sheet

LIQUID CRYSTAL DISPLAY

BACKGROUND OF THE INVENTION

1. Field of the Invention

The present invention relates to a liquid crystal display, and particularly, to a liquid crystal display of a bend alignment mode.

2. Description of the Related Art

Liquid crystal displays (LCDs) have great advantages such as thinner profiles, lighter weights, and lower power consumption as compared with cathode ray tubes (CRTs). The liquid crystal display has a liquid crystal cell and a pair of polarizing plates disposed on both sides of the liquid crystal cell. The liquid crystal cell includes liquid crystalline molecules, two substrates for enclosing the liquid crystalline molecules, and an electrode layer for applying voltage to the liquid crystalline molecules.

Moreover, an alignment film is usually provided on each of the two substrates so as to align the enclosed liquid crystalline molecules.

Moreover, an optical film (phase retarder) is often provided between the liquid crystal cell and the polarizing plate so as to eliminate coloration of an image to be displayed on the liquid crystal cell.

A laminate of the polarizing plate (polarizer) and the optical film functions as an elliptically polarizing plate. Moreover, in some cases, the optical film is provided with a function to enlarge the viewing angle of the liquid crystal cell. As the optical film, a stretched birefringent film has been conventionally used.

It has also been proposed to use an optical film having a first optical anisotropic layer containing a discotic compound in place of the stretched birefringent film (see Japanese Patent Application Laid-Open (JP-A) No. 06-214116, U.S. Pat. Nos. 5,583,679 and 5,646,703, and German Patent Application No. DE 3 911 620).

The first optical anisotropic layer is formed by aligning a discotic compound and fixing its alignment state. This discotic compound generally has a large birefringence. Moreover, the discotic compound can be in various alignment modes.

Therefore, using the discotic compound makes it possible to manufacture an optical film having optical properties that cannot be obtained by the conventional stretched birefringent film.

For example, liquid crystal displays using liquid crystal cells of a bend alignment mode where rod-shaped liquid crystalline molecules are, in upper and lower parts of the liquid crystal cell, aligned in substantially opposite directions (symmetrically) have been proposed (see U.S. Pat. Nos. 4,583,825 and 5,410,422).

In such liquid crystal displays, since the rod-shaped liquid crystalline molecules in the upper and lower parts of the liquid crystal cell have been aligned symmetrically, the liquid crystal cell of the bend alignment mode has a self-optical compensatory function. Therefore, this liquid crystal mode is referred to also as an OCB (Optically Compensatory Bend) liquid crystal mode.

The liquid crystal displays of the bend alignment mode have an advantage of a high response speed.

The bend alignment mode has features in a wider viewing angle and a higher response speed as compared with the common liquid crystal modes (TN and STN modes).

However, in comparison with the CRTs, the liquid crystal displays of the bend alignment mode require further improvement. In order to further improve the liquid crystal display of the bend alignment mode, it can be considered to use an optical film as in the common liquid crystal modes.

However, the conventional optical film made of a stretched birefringent film was insufficient in the optical compensatory function for the liquid crystal display of the bend alignment mode.

As described above, it has been proposed to use an optical film having an optical anisotropic layer containing a discotic compound and a support in place of the stretched birefringent film.

Furthermore, liquid crystal displays of the bend alignment mode using optical films containing discotic compounds have also been proposed (see JP-A No. 09-197397 and International Publication No. WO 96/37804).

Using the optical films containing discotic compounds allows significantly improving the viewing angles of the liquid crystal displays of the bend alignment mode.

A problem has been pointed out that light with a specific wavelength leaks to cause coloration of a display image when an optical film containing a discotic compound is used for a liquid crystal display of the bend alignment mode (see JP-A No. 11-316378).

There is a description to the effect that the cause for this coloration exists in wavelength dependence of the transmittance of an elliptically polarizing plate (a laminate of a polarizer and an optical film).

And, it has been reported that the maximum optical compensatory effect on a liquid crystal cell of the bend alignment mode can be obtained by disposing the first optical anisotropic layer and the polarizer so that an angle between an average direction of orthographic projections of the normal lines to discotic planes of the discotic compound onto the first optical anisotropic layer and an in-plane transmission axis of the polarizer becomes substantially 45°.

Moreover, various methods have been proposed to reduce a change in hue and prevent tone reversal of a bend-alignment liquid crystal display using an optical film containing a discotic compound (see Japanese Patent (JP-B) No. 3056997, JP-A Nos. 2002-40429, and 2006-243179).

In recent years, applications of liquid crystal displays have been expanded, and liquid crystal displays have been adopted in, for example, car navigation systems, instrument panels, rear-seat gaming applications, and Head-Up Displays.

Therefore, in bend-alignment liquid crystal displays for such applications, it becomes necessary to realize a gradation display with a higher degree of freedom, so that a further improvement in transmittance is demanded.

For improving a liquid crystal display in transmittance, there is a method for increasing the liquid crystal cell in $\Delta nd$ and a method for increasing the optical film in Rth (see JP-A Nos. 09-211444 and 2006-243179).

However, in the method for increasing the liquid crystal cell in $\Delta nd$, it is necessary to optimize optical characteristics of the optical film according to the value $\Delta nd$ of the liquid crystal cell.

In addition, as the method for increasing the optical film in Rth, when an additive to develop such optical characteristics is added, manufacturability is lowered due to bleeding of the additive and a haze degradation, so that realization has been difficult.

BRIEF SUMMARY OF THE INVENTION

The present invention aims at solving the problems that have conventionally existed and achieve the following object. That is, it is an object of the present invention to provide a liquid crystal display which is improved in transmittance by securing Rth of the optical film as a whole, without lowering manufacturability, with a simple configuration.

As a result of keen examinations, the inventors of the present invention have obtained the following findings. The findings are that the problems are solved by combining, in a liquid crystal display having at least three optical anisotropic layers and a liquid crystal cell, a Δnd value of the liquid crystal cell and optical characteristics of the respective optical anisotropic layers so as to satisfy a predetermined relationship.

The present invention is based on the findings by the inventors of the present invention, and a means for solving the problems is as follows. Specifically, it is a liquid crystal display containing:

a liquid crystal cell containing a pair of transparent substrates and a liquid crystal layer containing liquid crystal molecules, sandwiched between the pair of the transparent substrates; and a polarizing plate, disposed on an outside of each transparent plate, and containing at least a polarizer and an optical film comprising at least first, second and third optical anisotropic layers, wherein the liquid crystal display device satisfies the following conditions (1) to (7):

(1) the liquid crystal cell having a Δnd value in the range of 800 or more and less than 1,200;

(2) the first optical anisotropic layer having a rubbing angle of 40° to 50° with respect to a transmission axis of the polarizing plate;

(3) the first optical anisotropic layer having an in-plane retardation value $Re_1$ of 25 nm or more and 50 nm or less at a wavelength of 550 nm, and the in-pate retardation value $Re_1$ being defined by the following numerical formula (I);

(4) within a plane including, of directions forming 45° with respect to a longitudinal direction of the first optical anisotropic layer, a direction where an in-plane refractive index is reduced and a normal line to the first optical anisotropic layer, a retardation value Re (40°) measured from a direction tilted by 40° in a plane direction of the first optical anisotropic layer from the normal line and a retardation value Re (−40°) measured from a direction tilted by 40° in reverse from the normal line satisfying the following numerical formula (II);

(5) the second optical anisotropic layer having an in-plane retardation value $Re_2$ in the range of −10 nm or more and 60 nm or less at a wavelength of 550 nm where the in-plate retardation value $Re_2$ being defined by the following numerical formula (I), and a retardation value $Rth_2$ in a thickness direction of the second optical anisotropic layer being in the range of 0 nm or more and 300 nm or less at a wavelength of 550 nm where the retardation value $Rth_2$ being defined by the following numerical formula (III);

(6) the third optical anisotropic layer has an in-plane retardation value $Re_3$ in the range of −10 nm or more and 60 nm or less at a wavelength of 550 nm where the in-pate retardation value $Re_3$ being defined by the following numerical formula (I), and a retardation value $Rth_3$ in a thickness direction of the third optical anisotropic layer being in the range of 25 nm or more and 300 nm or less at a wavelength of 550 nm where the retardation value $Rth_3$ being defined by the following numerical formula (III); and $$200(nm) \leq Rth_2 + Rth_3 \leq 600(nm), \quad (7)$$

$$Re = (nx - ny) \times d \quad \text{Numerical Formula (I)}$$

$$3 \leq Re(40°)/Re(-40°) \leq 20 \quad \text{Numerical Formula (II)}$$

$$Rth = ((nx + ny)/2 - nz) \times d \quad \text{Numerical Formula (III)}$$

wherein nx and ny denote refractive indexes in slow and fast axis directions in the plane of the first optical anisotropic layer, respectively, in the numerical formula (I), and nz denotes a refractive index in a film thickness direction, and d denotes a thickness in the numerical formula (III).

DETAILED DESCRIPTION OF THE INVENTION

Figure 1:
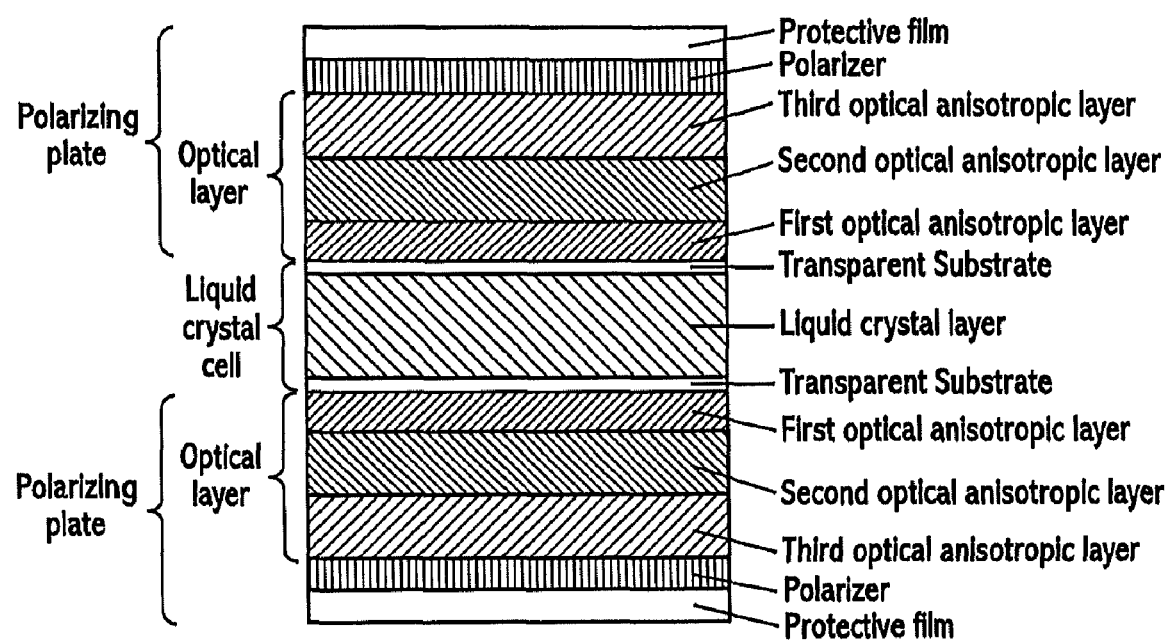
FIG. 1 is the outline of a cross-sectional view of an illustrative embodiment of the invention.

Hereinafter, a liquid crystal display according to the present invention will be described in detail.

In the description of the present embodiment, "45°," "parallel," or "orthogonal" means being within a range of a strict angle ± less than 5°. An error from the strict angle is preferably less than 4°, and more preferably, less than 3°.

Moreover, in terms of the angle, "+" means a clockwise direction, and "−" means a counterclockwise direction.

Moreover, a "slow axis" means a direction where the refractive index is maximized, and a "visible light region" means 380 nm to 780 nm.

Furthermore, a measuring wavelength of the refractive index is a value in a visible light range (λ=550 nm) unless particularly described.

Moreover, in the description of the present embodiment, a "polarizing plate" is used in the sense to include both a long polarizing plate and a polarizing plate cut into a size that can be incorporated in a liquid crystal device unless particularly described. Also, the "cutting" herein mentioned includes "punching," "dicing," and the like.

Here, in the description of the present embodiment, a "polarizer" and a "polarizing plate" are used being distinguished from each other, and the "polarizing plate" means a laminate having a transparent protective film to protect a "polarizer" on at least one surface of the "polarizer."

Moreover, in the description of the present embodiment, a "molecular symmetry axis" denotes, when a molecule has a rotation axis of symmetry, the axis of symmetry, however, in a strict sense, this does not require that the molecule is rotationally symmetrical.

Generally, in a discotic liquid crystal compound, the molecular symmetry axis is coincident with an axis that passes through the center of a discotic plane and is vertical to the discotic plane, and in a rod-shaped liquid crystal compound, the molecular symmetry axis is coincident with the long axis of a molecule.

Moreover, in the present specification, Re(λ) and Rth(λ) represent an in-plane retardation and a retardation in the thickness direction, respectively, at a wavelength of λ. Re(λ) is measured by making light with a wavelength of λnm in a film normal-line direction in KOBRA 21ADH or WR (manufactured by Oji Scientific Instruments Co., Ltd.).

When the film to be measured is one represented by a uniaxial or biaxial index ellipsoid, Rth(λ) is calculated by the following method.

Rth(λ) is, by measuring the Re(λ) at six points in total by making light with a wavelength of λnm, at 10-degree steps from a normal-line direction to one side of 50° with respect to the film normal-line direction, from the tilted directions, respectively, using an in-plane slow axis (judged by KOBRA 21ADH or WR) as a tilt axis (rotation axis) (with no slow axis, an arbitrary direction in a film plane is used as a rotation axis), calculated by KOBRA 21ADH or WR based on the measured retardation values, an assumed value of an average refractive index, and an inputted film thickness value.

In the above, in the case of a film having a direction where the retardation value becomes zero at a certain tilt angle using an in-plane slow axis from the normal-line direction as a rotation axis, the retardation value at an angle larger than the tilt angle is calculated by KOBRA 21ADH or WR after changing the sign to a negative.

Also, by measuring the retardation values from two arbitrary tilted directions using the slow axis as a tilt axis (rotation axis) (with no slow axis, an arbitrary direction in a film plane is used as a rotation axis), Rth can also be calculated based on the values, an assumed value of an average refractive index, and an inputted film thickness value by the following formula (A) and formula (III).

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Formula (A)

Also, the $Re(\theta)$ described above represents a retardation value in the direction tilted by an angle $\theta$ from the normal-line direction.

In addition, nx in the formula (A) represents a refractive index in the slow axis direction in a plane, ny represents a refractive index in the direction orthogonal to nx in the plane, and nz represents a refractive index in the direction orthogonal to nx and ny.

$$Rth = ((nx+ny)/2 - nz) \times d \quad \text{Formula (III)}$$

When the film to be measured is one that cannot be expressed by a uniaxial or biaxial index ellipsoid, that is, a film without an optical axis, $Rth(\lambda)$ is calculated by the following method.

$Rth(\lambda)$ is, by measuring the $Re(\lambda)$ at 11 points by making light with a wavelength of $\lambda$ nm, at 10-degree steps from $-50°$ to $+50°$ with respect to the film normal-line direction, from the tilted directions, respectively, using an in-plane slow axis (judged by KOBRA 21ADH or WR) as a tilt axis (rotation axis), calculated by KOBRA 21ADH or WR based on the measured retardation values, an assumed value of an average refractive index, and an inputted film thickness value.

Moreover, in the measurement described above, the assumed value of an average refractive index can use a value from the Polymer Handbook (John Wiley & Sons Inc.), a catalog of various optical films. As for an optical film whose average refractive index value is unknown, the value can be measured by an Abbe refractometer. Average refractive index values of major optical films are exemplified as follows: cellulose acylate (1.48), a cycloolefin polymer (1.52), polycarbonate (1.59), polymethyl methacrylate (1.49), and polystyrene (1.59). By inputting the assumed value of the average refractive index from these and the film thickness, KOBRA 21ADH or WR calculates nx, ny, and nz. $Nz=(nx-nz)/(nx-ny)$ is further calculated from the calculated nx, ny, and nz.

(Optical Film)

<Optical Film Configuration>

An optical film in the present invention has a lamination structure in which at least three optical anisotropic layers are laminated.

Concretely, the first optical anisotropic layer, the second optical anisotropic layer, and the third optical anisotropic layer are laminated in this order to compose an optical film. Also, in the following, a laminate of the second optical anisotropic layer and the third optical anisotropic layer is sometimes referred to as an optical anisotropic layer laminate.

The optical film used for a liquid crystal display of the present invention is an optical film that satisfies the following optical requirements (2) to (7) on an assumption that a $\Delta$nd value at the time no voltage is applied to a liquid crystal cell to be described later is 800 or more and less than 1,200.

(2) The first optical anisotropic layer has a rubbing angle of 40° to 50° with respect to a transmission axis of a polarizing plate.

(3) The first optical anisotropic layer has an in-plane retardation value $Re_1$ defined by the following numerical formula (I) of 25 nm or more and 50 nm or less at a wavelength of 550 nm.

(4) Within a plane including, of directions forming 45° with respect to a longitudinal direction of the first optical anisotropic layer, a direction where an in-plane refractive index is reduced and a normal line to the first optical anisotropic layer, a retardation value Re (40°) measured from a direction tilted by 40° in a plane direction of the first optical anisotropic layer from the normal line and a retardation value Re (−40°) measured from a direction tilted by 40° in reverse from the normal line satisfy the following numerical formula (II).

(5) The second optical anisotropic layer has an in-plane retardation value $Re_2$ defined by the above numerical formula (I) of −10 nm or more and 60 nm or less at a wavelength of 550 nm, and the second optical anisotropic layer has a retardation value $Rth_2$ in the thickness direction defined by the following numerical formula (III) of 0 nm or more and 300 nm or less at a wavelength of 550 nm.

(6) The third optical anisotropic layer has an in-plane retardation value $Re_3$ defined by the following numerical formula (I) of −10 nm or more and 60 nm or less at a wavelength of 550 nm, and the third optical anisotropic layer has a retardation value $Rth_3$ in the thickness direction defined by the following numerical formula (III) of 25 nm or more and 300 nm or less at a wavelength of 550 nm.

$$200(nm) \leq Rth_2 + Rth_3 \leq 600(nm) \quad (7)$$

$$Re = (nx - ny) \times d \quad \text{Numerical Formula (I)}$$

$$3 \leq Re(40°)/Re(-40°) \leq 20 \quad \text{Numerical Formula (II)}$$

$$Rth = ((nx+ny)/2 - nz) \times d \quad \text{Numerical Formula (III)}$$

In the above numerical formula (I), nx and ny denote refractive indexes in slow and fast axis directions in the plane of the first optical anisotropic layer, respectively. In the above numerical formula (III), nz denotes a refractive index in a film thickness direction, and d denotes a thickness.

<<First Optical Anisotropic Layer>>

Of the three optical anisotropic layers, the first optical anisotropic layer is preferably an optical anisotropic layer formed of a liquid crystal compound.

The first optical anisotropic layer may be formed directly on the surface of the second optical anisotropic layer to be described later, or may be formed on an alignment film formed on the second optical anisotropic layer. It is also possible to fabricate an optical film of the present invention by transferring a liquid crystal compound layer formed on a separate base material onto the second optical anisotropic layer by use of an adhesive or the like.

As the liquid crystal compound used for forming the first optical anisotropic layer, a rod-shaped liquid crystal compound and a discotic liquid crystal compound can be mentioned. The rod-shaped liquid crystal compound and the discotic liquid crystal compound may be of either a high-molecular liquid crystal or a low-molecular liquid crystal, and further, a compound of a crosslinked low-molecular liquid crystal no longer exhibiting liquid crystallinity is also included.

[Optical Characteristics of First Optical Anisotropic Layer]

The first optical anisotropic layer that is a component of the polarizing plate used for the liquid crystal display of the present invention preferably has, as its optical characteristics, a retardation value $Re_1$ defined by the above numerical formula (I) of 25 nm or more and 50 nm or less at a wavelength of 550 nm.

In addition, within a plane including, of directions forming 45° with respect to a longitudinal direction of the first optical anisotropic layer, a direction where an in-plane refractive index is reduced and a normal line to the first optical anisotropic layer, a retardation value Re (40°) measured from a direction tilted by 40° in a plane direction of the first optical anisotropic layer from the normal line and a retardation value Re (40°) measured from a direction tilted by 40° in reverse from the normal line preferably satisfy the following numerical formula (II).

$$3 \leq Re(40°)/Re(-40°) \leq 20 \qquad \text{Numerical Formula (II)}$$

[Rod-Shaped Liquid Crystal Compound]

Preferred examples of the rod-shaped liquid crystal compound that can be used for the present invention include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles.

Examples of the rod-shaped liquid crystal compound further include metal complexes. Liquid crystal polymers containing a rod-shaped liquid crystal compound in repeating units can also be used. In other words, the rod-shaped liquid crystal compound may be bonded to a (liquid crystal) polymer.

Rod-shaped liquid crystal compounds have been described in Chapter 4, Chapter 7, and Chapter 11 of the Quarterly Chemical Review Vol. 22 "Chemistry of Liquid Crystals" (1994) edited by the Chemical Society of Japan and Chapter 3 of the "Liquid Crystal Device Handbook" edited by the 142nd Committee of the Japan Society for the Promotion of Science.

The birefringence of the rod-shaped liquid crystal compound used for the present invention is preferably in a range of 0.001 to 0.7.

The rod-shaped liquid crystal compound preferably has a polymerizable group for fixing its alignment state. The polymerizable group is preferably an unsaturated polymerizable group or an epoxy group, more preferably, an unsaturated polymerizable group, and particularly preferably, an ethylenically unsaturated polymerizable group.

[Discotic Liquid Crystal Compound]

Examples of the discotic liquid crystal compound include benzene derivatives described in a study report by C. Destrade et al., Mol. Cryst. Liq. Cryst., Vol. 71, page 111 (1981); truxene derivatives described in a study report by C. Destrade et al., Mol. Cryst., Vol. 122, page 141 (1985) and Physics Lett. A, Vol. 78, page 82 (1990); cyclohexane derivatives described in a study report by B. Kohne et al., Angew. Chem., Vol. 96, page 70 (1984); and azacrown-based or phenylacetylene-based macrocycles described in a study report by J. M. Lehn et al., J. Chem. Commun., page 1794 (1985) and a sturdy report by J. Zhang et al., J. Am. Chem. Soc., Vol. 116, page 2655 (1994).

The examples of the discotic liquid crystal compound also include compounds having a structure with a core at the center of the molecule on which straight alkyl, alkoxy, or substituted benzoyloxy groups are radially substituted as side chains of the core and exhibiting crystallinity. It is preferable that the discotic liquid crystal compound has rotation symmetry in the form of a molecule or a molecular assembly and can be provided with a certain alignment.

When the first optical anisotropic layer is formed from a discotic liquid crystal compound, the compound that is finally included in the first optical anisotropic layer no longer needs to exhibit liquid crystallinity.

When, for example, a low-molecular discotic liquid crystal compound has heat- or light-reactive groups and the groups are reacted by heat or light and polymerized or crosslinked to have a high molecular weight, whereby a first optical anisotropic layer is formed, the compound contained in the first optical anisotropic layer may no longer have crystallinity.

Preferred examples of the discotic liquid crystal compound have been described in JP-A No. 08-50206. In addition, there is a description of polymerization of a discotic liquid crystal compound in JP-A No. 08-27284.

In order to fix the discotic liquid crystal compound by polymerization, it is necessary to bond a polymerizable group as a substituent to a discotic core of the discotic liquid crystal compound. However, when a polymerizable group is directly bonded to the discotic core, it becomes difficult to maintain an alignment state in a polymerization reaction. Therefore, a linking group is introduced between the discotic core and the polymerizable group.

Accordingly, the discotic liquid crystal compound having a polymerizable group is preferably a compound expressed by the following general formula (I).

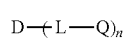

General Formula (I)

In the above general formula (I), D denotes a discotic core, L denotes a divalent linking group, Q denotes a polymerizable group, and n denotes an integer of 4 to 12.

Examples (D1) to (D15) of the discotic core (D) are shown in the following. In the following respective examples, LQ (or QL) means a combination of a divalent linking group (L) and a polymerizable group (Q).

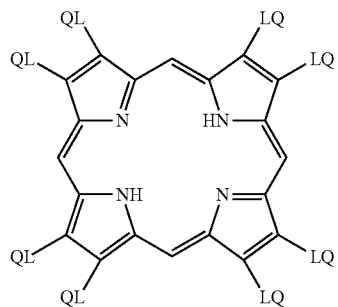
(D1)
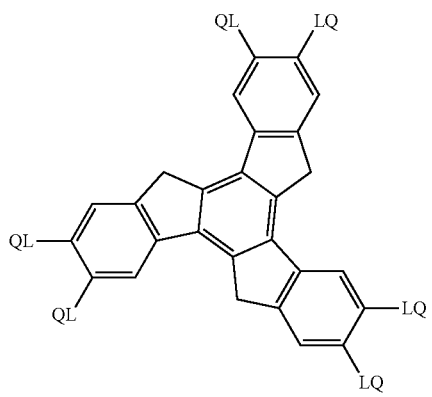
(D5)
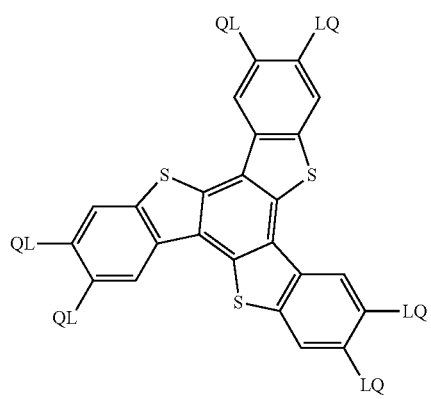
(D2)
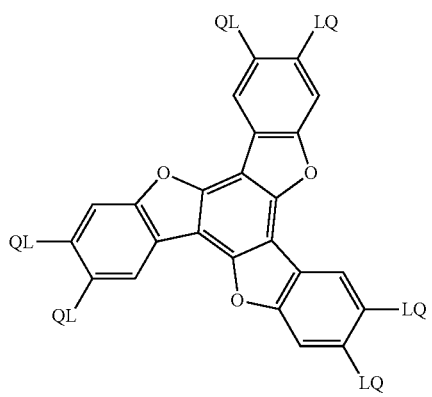
(D6)
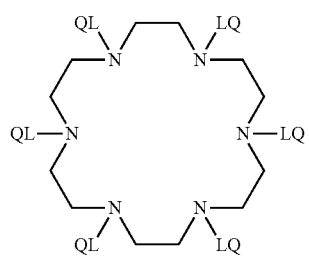
(D3)
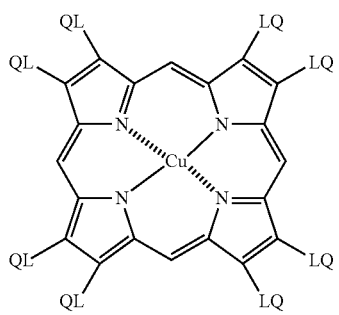
(D7)
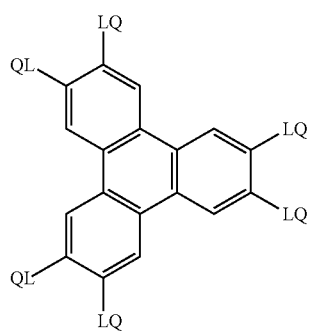
(D4)
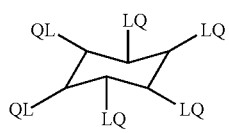
(D8)

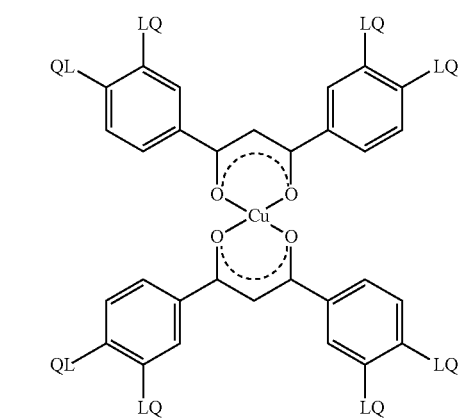
(D9)
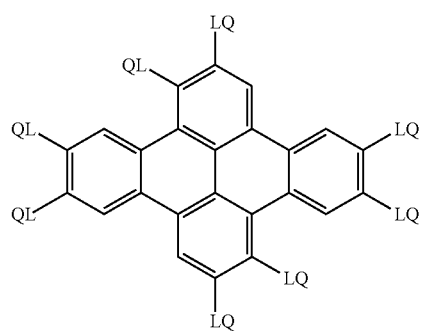
(D10)
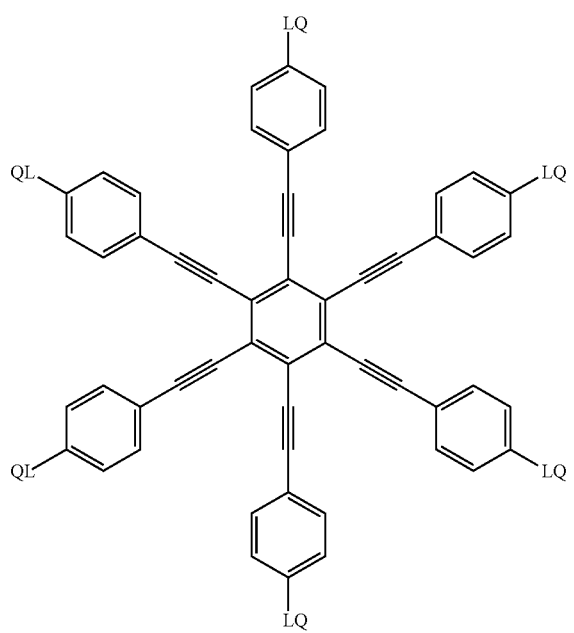
(D11)
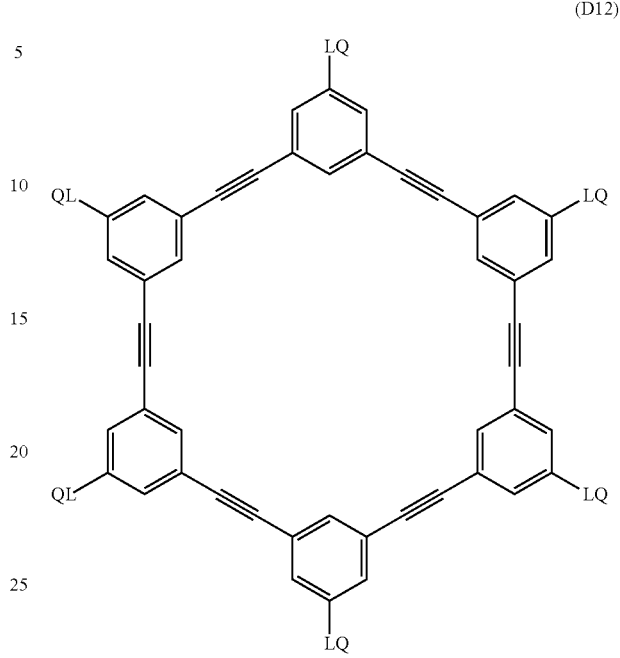
(D12)
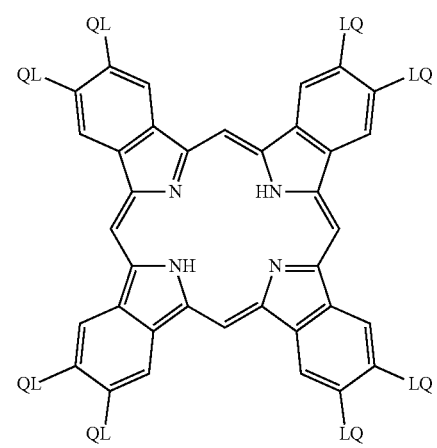
(D13)
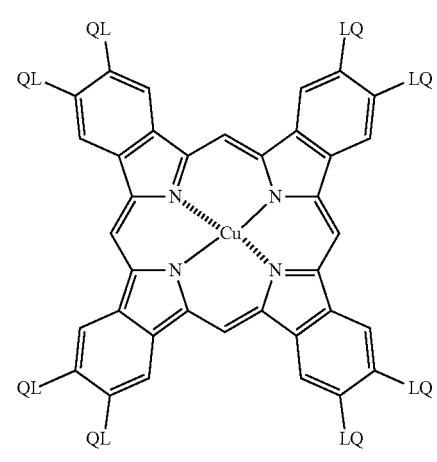
(D14)

-continued

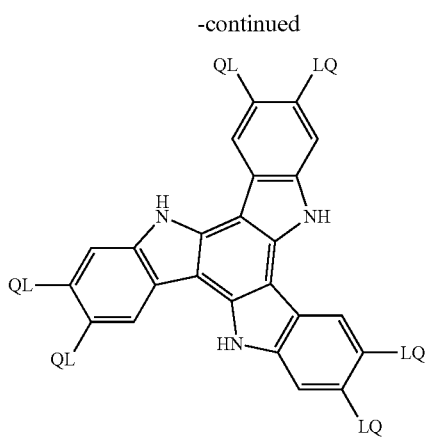
(D15)

Moreover, in the above general formula (I), the divalent linking group (L) is preferably a divalent linking group selected from a group consisting of an alkylene group, an alkenylene group, an arylene group, —CO—, —NH—, —O—, —S—, and combinations thereof.

The divalent linking group (L) is more preferably a divalent linking group of a combination of at least two divalent groups selected from a group consisting of an alkylene group, an alkenylene group, an arylene group, —CO—, —NH—, —O—, and —S—.

The divalent linking group (L) is particularly preferably a divalent linking group of a combination of at least two divalent groups selected from a group consisting of an alkylene group, an arylene group, —CO—, and —O—.

The number of carbon atoms of the alkylene group is preferably 1 to 12. The number of carbon atoms of the alkenylene group is preferably 2 to 12. The number of carbon atoms of the arylene group is preferably 6 to 10.

Examples (L1 to L24) of the divalent linking group (L) are shown in the following. The left side bonds to the discotic core (D), and the right side bonds to the polymerizable group (Q). AL means an alkylene group or an alkenylene group, while AR means an arylene group. Also, the alkylene group, the alkenylene group, and the arylene group may have a substituent (e.g. an alkyl group).

L1: -AL-CO—O-AL
L2: -AL-CO—O-AL-O—
L3: -AL-CO—O-AL-O-AL
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) of the above general formula (I) is determined according to the type of polymerization reaction. The polymerizable group (Q) is preferably an unsaturated polymerizable group or an epoxy group, and more preferably, an unsaturated polymerizable group, and particularly preferably, an ethylenically unsaturated polymerizable group.

Moreover, in the above general formula (I), n denotes an integer of 4 to 12. A detailed FIGURE is determined according to the type of the discotic core (D). Also, a plurality of combinations of L and Q may be different but are preferably the same.

In terms of alignment of the liquid crystal compound in the first optical anisotropic layer, an average direction of molecular symmetry axes of the first optical anisotropic layer is preferably 43° to 47° with respect to the longitudinal direction.

In a hybrid alignment, the angle between the molecular symmetry axis of the liquid crystal compound and a plane of the second optical anisotropic layer increases or decreases as the distance in the depth direction of the first optical anisotropic layer and from the plane of the second optical anisotropic layer increases.

The angle preferably increases with an increase in distance. Furthermore, as a variation in angle, a continuous increase, a continuous decrease, an intermittent increase, an intermittent decrease, a variation including a continuous increase and a continuous decrease, or an intermittent variation including an increase and a decrease is possible. In the case of an intermittent variation, included is a region where the tilt angle does not vary in the middle of the thickness direction.

As for the angle, there may be a region where the angle does not vary as long as the angle as a whole increases or decreases. Furthermore, it is preferable that the angle varies continuously.

The average direction of the molecular symmetry axes of the liquid crystal compound can be generally adjusted by selecting the material of the liquid crystal compound or the alignment film or by selecting a rubbing treatment method.

As a preferred aspect of the present invention, in the case of an optical film where slow axes of the second optical anisotropic layer and the liquid crystal compound layer are not orthogonal or parallel to each other, by applying a rubbing treatment in a direction different from that of the slow axis of the second optical anisotropic layer, the slow axis of the liquid crystal compound layer can be simply adjusted in any way.

Moreover, the molecular symmetry axis direction of the liquid crystal compound on the front surface side (air side) can be generally adjusted by selecting the type of liquid crystal compound or an additive used in combination with the liquid crystal compound.

Examples of the additive used in combination with the liquid crystal compound include a plasticizer, a surfactant, a polymerizable monomer, and a polymer. The degree of variation in the alignment direction of the molecular symmetry axes can also be adjusted, as in the above, by selecting the liquid crystal compound and the additive. With regard to the surfactant in particular, it is preferable to have compatibility with surface tension control of the aforementioned coating solution.

The plasticizer, surfactant, and polymerizable monomer used in combination with the liquid crystal compound preferably have compatibility with the discotic liquid crystal compound and can give variation in tilt angle of the liquid crystal compound or do not hinder alignment. As the polymerizable monomer, compounds having vinyl groups, vinyloxy groups, acryloyl groups, and methacryloyl groups are preferred.

In addition, the amount of addition of the abovementioned compound is generally in a range of 1% by mass to 50% by mass, and preferably in a range of 5% by mass to 30% by mass with respect to the amount of the liquid crystal compound. Using polymerizable monomers having 4 or more reactive functional groups by mixture can improve adhesion between the alignment film and the first optical anisotropic layer.

When a discotic liquid crystal compound is used as a liquid crystal compound, it is preferable to use a polymer having a certain degree of compatibility with the discotic liquid crystal compound and which can give variation in tilt angle to the discotic liquid crystal compound.

Examples of the polymer include cellulose ester. Preferred examples of the cellulose ester include cellulose acetate, cellulose acetate propionate, hydroxypropyl cellulose, and cellulose acetate butyrate.

In order not to hinder alignment of the discotic liquid crystal compound, the amount of addition of the abovementioned polymer is preferably in a range of 0.1% by mass to 10% by mass, more preferably, in a range of 0.1% by mass to 8% by mass, and even more preferably, in a range of 0.1% by mass to 5% by mass, with respect to the discotic liquid crystal compound.

The phase transition temperature from a discotic nematic liquid crystal phase to a solid phase of the discotic liquid crystal compound is preferably 70° C. to 300° C., and more preferably, 70° C. to 170° C.

In the present invention, the thickness of the first anisotropic layer is preferably 0.1 μm to 20 μm, more preferably, 0.5 μm to 15 μm, and particularly preferably, 1 μm to 10 μm.

<<Alignment Film>>

The optical film of the present invention preferably has an alignment film between the second optical anisotropic layer and the first optical anisotropic layer.

In the present invention, the alignment film is preferably a layer formed of a crosslinked polymer.

For the polymer used for the alignment film, either a self-crosslinkable polymer or a polymer crosslinked by a crosslinking agent can be used.

The abovementioned alignment film can be formed by making a polymer having functional groups or a polymer prepared by introducing functional groups react between polymer particles by light, heat, a pH variation, or the like, or by using a crosslinking agent being a highly reactive compound introduce a linking group from the crosslinking agent between polymer particles and thereby crosslinking the polymer particles.

The alignment film formed of a crosslinked polymer can be normally formed by applying a coating solution containing the abovementioned polymer or a mixture of a polymer and a crosslinking agent onto the second optical anisotropic layer and then carrying out heating or the like.

It is preferable that the degree of crosslinking is high in order to suppress the alignment film from causing dust in a rubbing step to be described later. When a value obtained by subtracting a ratio (Ma/Mb) of the amount (Ma) of a crosslinking agent remaining after crosslinking to the amount (Mb) of the crosslinking agent added into the coating solution from 1 (1−(Ma/Mb)) is defined as the degree of crosslinking, the degree of crosslinking is preferably 50% to 100%, more preferably, 65% to 100%, and particularly preferably, 75% to 100%.

In the present invention, for the polymer used for the alignment film, either a self-crosslinkable polymer or a polymer crosslinked by a crosslinking agent can be used. Moreover, a polymer having both functions can also be used.

Examples of the abovementioned polymer include polymers such as polymethyl methacrylate, an acrylic acid/methacrylic acid copolymer, a styrene/maleinimide copolymer, polyvinyl alcohol, modified polyvinyl alcohol, poly(N-methylolacrylamide), a styrene/vinyltoluene copolymer, chlorosulfonated polyethylene, nitrocellulose, polyvinyl chloride, chlorinated polyolefin, polyester, polyimide, a vinyl acetate/vinyl chloride copolymer, an ethylene/vinyl acetate copolymer, carboxymethylcellulose, polyethylene, polypropylene, and polycarbonate and compounds such as silane coupling agents.

Preferred examples of the polymer include water-soluble polymers such as poly(N-methylolacrylamide), carboxymethylcellulose, gelatin, polyvinyl alcohol, and modified polyvinyl alcohol, more preferred are gelatin, polyvinyl alcohol, and modified polyvinyl alcohol, and particularly preferred are polyvinyl alcohol and modified polyvinyl alcohol.

Among the abovementioned polymers, polyvinyl alcohol or modified polyvinyl alcohol is preferred. The polyvinyl alcohol has, for example, a degree of saponification of 70% to 100%, generally, a degree of saponification of 80% to 100%, and more preferably, a degree of saponification of 85% to 95%.

The degree of polymerization is preferably in a range of 100 to 3,000. Examples of the modified polyvinyl alcohol include modified products of polyvinyl alcohol such as ones modified by copolymerization (as modifying groups, for example, COONa, Si(OX)$_3$, N(CH$_3$)$_3$.Cl, C$_9$H$_{19}$COO, SO$_3$, Na, C$_{12}$H$_{25}$, and the like are introduced), ones modified by a chain transfer (as modifying groups, for example, COONa, SH, C$_{12}$H$_{25}$, and the like are introduced), and ones modified by block polymerization (as modifying groups, for example, COOH, CONH$_2$, COOR, C$_6$H$_5$, and the like are introduced).

The degree of polymerization is preferably in a range of 100 to 3,000. Among these, an unmodified to modified polyvinyl alcohol with a degree of saponification of 80% to 100% is preferred, and an unmodified or alkylthio-modified polyvinyl alcohol with a degree of saponification of 85% to 95% is more preferable.

The modified polyvinyl alcohol used for the alignment film is preferably obtained by a reaction between a compound expressed by the following general formula (2) and polyvinyl alcohol. In the following general formula (2), R$^1$ represents an unsubstituted alkyl group or an alkyl group substituted with an acryloyl group, a methacryloyl group, or an epoxy group, W represents a halogen atom, an alkyl group, or an alkoxy group, X represents an atomic group necessary for forming an active ester, an acid anhydride, or an acid halide, l represents 0 or 1, and n represents an integer of 0 to 4.

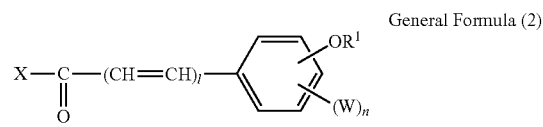

General Formula (2)

In addition, the modified polyvinyl alcohol used for the alignment film is preferably obtained also by a reaction between a compound expressed by the following general formula (3) and polyvinyl alcohol. In the following general formula (3), X$^1$ represents an atomic group necessary for forming an active ester, an acid anhydride, or an acid halide, and m represents an integer of 2 to 24.

General Formula (3)

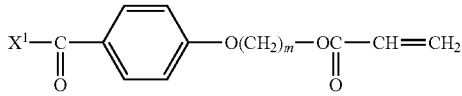

Examples of the polyvinyl alcohol used for reacting with the compounds expressed by the general formula (2) and the general formula (3) include the abovementioned unmodified polyvinyl alcohols and modified products of polyvinyl alcohol such as the abovementioned ones modified by copolymerization, ones modified by a chain transfer, and ones modified by block polymerization.

Preferred examples of the abovementioned specific modified polyvinyl alcohol have been described in detail in JP-A No. 08-338913.

When a hydrophilic polymer such as polyvinyl alcohol is used for the alignment film, from the standpoint of film hardness, it is preferable to control the water content, and the water content to be controlled is preferably 0.4% to 2.5%, and more preferably, 0.6% to 1.6%. The water content can be measured by a commercially available water content meter according to the Karl Fischer method.

Here, the alignment film preferably has a film thickness of 10 μm or less.

<<Second Optical Anisotropic Layer and Third Optical Anisotropic Layer>>

The second optical anisotropic layer and the third optical anisotropic layer are preferably transparent, and concretely, these are preferably transparent polymer films with a light transmittance of 80% or more.

Examples of polymer films that can be used as the second optical anisotropic layer and the third optical anisotropic layer include polymer films formed of cellulose esters (e.g., cellulose acetate, cellulose diacetate), norbornene-based polymers, polymethyl methacrylate, and the like. Commercially available polymers (ARTON (registered trademark) and ZEONEX (registered trademark) as norbornene-based polymers) may be used. Among these, a film formed of cellulose ester is preferred, and a film formed of a lower fatty acid ester of cellulose is more preferred. The lower fatty acid means a fatty acid with 6 or less carbon atoms. Particularly, a film formed of an ester with 2 carbon atoms (cellulose acetate), 3 carbon atoms (cellulose propionate), or 4 carbon atoms (cellulose butyrate) is preferable.

And, among these, a film formed of cellulose acetate is particularly preferable. In addition, mixed fatty acid esters such as cellulose acetate propionate and cellulose acetate butyrate can also be used.

Even conventionally known polymers readily causing birefringence such as polycarbonate and polysulfone can also be used as the second optical anisotropic layer and the third optical anisotropic layer in the present invention when the molecules are modified to control the occurrence of birefringence as described in International Patent Publication No. WO 00/26705.

Here, when the optical film of the present invention is used as a protective film or a retardation film of the polarizing plate, it is preferable to use, as the polymer film, cellulose acetate with the degree of acetylation 55.0% to 62.5%. The degree of acetylation is more preferably 57.0% to 62.0%.

Here, the degree of acetylation means the amount of bonded acetic acid per unit mass of cellulose.

The degree of acetylation is obtained by measurement and calculation according to ASTM: D-817-91 (test method for cellulose acetate, etc.)

The cellulose acetate preferably has a viscosity average degree of polymerization (DP) of 250 or more, and more preferably, 290 or more. In addition, the cellulose acetate preferably has a narrow molecular weight distribution of Mw/Mn (Mw means a weight average molecular weight and Mn means a number average molecular weight) by gel permeation chromatography.

A concrete value of Mw/Mn is preferably 1.0 to 4.0, more preferably, 1.0 to 1.65, and particularly preferably, 1.0 to 1.6.

In the cellulose acetate, there is a tendency that the hydroxyl groups at 2-, 3-, and 6-positions of cellulose are not equally substituted but the degree of substitution at the 6-position is lower.

In the polymer films used as the second optical anisotropic layer and the third optical anisotropic layer, it is preferable that the degree of substitution at the 6-position is preferably equal to or higher than those at the 2- and 3-positions.

In addition, the ratio of the degree of substitution at the 6-position to the total degree of substitution at the 2-, 3-, and 6-positions is preferably 30% to 40%, more preferably, 31% to 40%, and particularly preferably 32% to 40%. The degree of substitution at the 6-position is preferably 0.88 or more. Here, the degree of substitution at each position can be measured by NMR.

Cellulose acetate having a high degree of substitution at the 6-position can be synthesized with reference to the methods of Synthesis Example 1 described in paragraph numbers [0043] to [0044], Synthesis Example 2 described in paragraph numbers [0048] to [0049], and Synthesis Example 3 described in paragraph numbers [0051] to [0052] of JP-A No. 11-5851.

A retardation value Re and a retardation value Rth of the second optical anisotropic layer and the third optical anisotropic layer are defined by the following formulae (I) and (III), respectively. In the following formulae (I) and (III), nx denotes a refractive index in the slow axis direction (direction where the refractive index is maximized) in a film plane, ny denotes a refractive index in the fast axis direction (direction where the refractive index is minimized) in a film plane, nz denotes a refractive index in the film thickness direction, and d denotes a film thickness in a unit of nm.

$Re=(nx-ny)\times d$   Formula (I)

$Rth=\{(nx+ny)/2-nz\}\times d$   Formula (III)

Here, an in-plane retardation value $Re_2$ of the second optical anisotropic layer is preferably −10 nm to 60 nm.

In addition, a retardation value $Rth_2$ in the thickness direction of the second optical anisotropic layer is preferably 0 nm to 300 nm.

On the other hand, an in-plane retardation value $Re_3$ of the third optical anisotropic layer is preferably −10 nm to 60 nm, and a retardation value $Rth_3$ in the thickness direction of the third optical anisotropic layer is preferably 25 nm to 300 nm.

Furthermore, a sum of the retardation value $Rth_2$ in the thickness direction of the second optical anisotropic layer and the retardation value $Rth_2$ in the thickness direction of the third optical anisotropic layer is preferably 200 nm to 600 nm.

Also, the birefringence (Δn: nx−ny) of the cellulose acetate film is preferably 0.00025 to 0.00088. In addition, the birefringence {(nx+ny)/2−nz} in the thickness direction of the cellulose acetate film is preferably 0.00088 to 0.005.

In addition, the second optical anisotropic layer and the third optical anisotropic layer both preferably have absolute values of photoelastic coefficients in their film-forming direction and a direction orthogonal to the film-forming direction of $10 \times 10^{-12} m^2/N$ or less.

Furthermore, it is more preferable that, in a laminate of the first to third optical anisotropic layers, within a plane including, of directions forming 45° with respect to a longitudinal direction thereof, a direction where an in-plane refractive index is reduced and a normal line to the first optical anisotropic layer, a retardation value Re (40°) measured from a direction tilted by 40° in a plane direction of the first optical anisotropic layer from the normal line and a retardation value Re (−40°) measured from a direction tilted by 40° in reverse from the normal line satisfy the following numerical formula (II). In the following numerical formula (I), nx and ny denote refractive indexes in slow and fast axis directions in the plane of the laminate of the first to third optical anisotropic layers, respectively.

$$Re=(nx-ny) \times d \qquad \text{Numerical Formula (I)}$$

$$3 \leq Re(40°)/Re(-40°) \leq 10 \qquad \text{Numerical Formula (II)}$$

In addition, when cellulose acetate films are used for the second optical anisotropic layer and the third optical anisotropic layer, it is preferable that a retardation increasing agent is contained in the films, and examples of preferred compounds and manufacturing methods thereof have been described in JP-A Nos. 2000-154261 and 2000-111914.

<Optical Film Manufacturing Method>

Next, a method for continuously manufacturing a preferred optical film of the present invention will be described.

<<Roll-Like Optical Film Manufacturing Method>>

As a roll-like optical film manufacturing method of the present invention, the following steps (1) to (4) are continuously performed.

Step (1): Applying a rubbing treatment by a rubbing roll to the surface of the second optical anisotropic layer being a long optical anisotropic layer laminate to be conveyed in the longitudinal direction or to the surface of the alignment film formed on the second optical anisotropic layer.

Step (2): Applying a coating solution containing a liquid crystal compound to the rubbed surface.

Step (3): Aligning the liquid crystal compound at a temperature equal to or more than a liquid crystal transition temperature simultaneously with or after drying the applied coating solution and fixing its alignment to fabricate the first optical anisotropic layer.

Step (4): Winding up the long laminate on which the first optical anisotropic layer is formed.

Here, while the liquid crystal compound is aligned at a temperature equal to or more than the liquid crystal transition temperature in step (3), it is preferable that a film plane velocity of air blowing over the surface of the liquid crystal compound in a direction other than the direction of the rubbing treatment satisfies the following formula (3), and it is more preferable that, in the following formula (3), V is 0 to $2.5 \times 10^{-3} \times \eta$. Also, in the following formula (3), V denotes a film plane velocity (m/sec) of air blowing over the surface of the liquid crystal compound, and η denotes a viscosity (cp) of the liquid crystal compound layer at an aligning temperature of the liquid crystal compound.

$$0<V<5.0 \times 10^{-3} \times \eta \qquad \text{Formula (3)}$$

According to the optical film manufacturing method of the present invention, an optical film where the average direction of orthographic projections of molecular symmetry axes of the liquid crystal compound onto the surface of the second optical anisotropic layer, that is, the average direction of molecular symmetry axes of the first optical anisotropic layer differs from the in-plane slow axis of the second optical anisotropic layer, that is, the longitudinal direction of the second optical anisotropic layer, and further, the angle between the average direction of the molecular symmetry axes and the rubbing direction is substantially 0°, preferably, −2° to 2°, and more preferably, −1° to 1° can be continuously stably manufactured, and this is suitable for mass production.

When the optical film of the present invention is applied to a liquid crystal display in an OCB mode, it is preferable to adhere the optical film and a polarizer by a roll to roll process, and it is preferable that the average direction of the molecular symmetry axes and the in-plane slow axis of the second optical anisotropic layer, that is, the longitudinal direction of the second optical anisotropic layer is substantially 45°.

Furthermore, in the optical film manufacturing method of the present invention, it is desirable to include any of the following requirements (a) to (d). Also, details of these respective steps have been described in JP-A No. 09-73081.

(a) Using, as the liquid crystal compound, a polymerizable liquid crystal compound having a crosslinking functional group in the above step (2), continuously irradiating light onto the coating layer and hardening the polymerizable liquid crystal compound by polymerization to be fixed in an alignment state in the above step (3), and then continuously performing the above step (4).

(b) Applying a rubbing treatment by a rubbing roll while removing dust from the surface of the second optical anisotropic layer or the alignment film in the above step (1).

(c) Performing a step of removing dust from the surface of the second optical anisotropic layer or the alignment film treated by rubbing before the above step (2).

(d) Inspecting optical characteristics of the formed first optical anisotropic layer by continuously measuring before the above step (4).

Now, details of the above steps (1) to (4) will be described in the following.

[Step (1)]

In the step (1), a rubbing treatment is applied by a rubbing roll to the surface of the second optical anisotropic layer being a long optical anisotropic layer laminate to be conveyed in the longitudinal direction or to the surface of the alignment film formed on the second optical anisotropic layer.

The diameter of the rubbing roll used for the step (1) is preferably 100 mm to 500 mm, and more preferably, 200 mm to 400 mm from the standpoint of handling suitability and cloth lifetime.

The width of the rubbing roll needs to be wider than the width of a film to be conveyed, and is preferably equal to the film width$\times 2^{1/2}$ or more.

In addition, it is preferable to set the number of revolutions of the rubbing roll low from the standpoint of dusting, and the number of revolutions is preferably 100 rpm to 1,000 rpm, and more preferably, 250 rpm to 850 rpm although it depends on alignability of the liquid crystal compound.

In order to maintain liquid crystal compound alignability even if the number of revolutions of the rubbing roll is reduced, it is preferable to heat the second optical anisotropic layer or the alignment film at the time of rubbing. The heating temperature is preferably (Tg of the material minus 50° C.) to (Tg of the material plus 50° C.) in terms of the film-plane temperature of the surface of the second optical anisotropic layer or the alignment film. When the alignment film formed of polyvinyl alcohol is used, it is preferable to control the environmental humidity of rubbing, and a relative humidity at 25° C. is preferably 25% RH to 70% RH, more preferably, 30% RH to 60% RH, and particularly preferably, 35% RH to 55% RH.

The conveying speed of the optical anisotropic layer laminate is preferably 10 m/min to 100 m/min, and more preferably, 15 m/min to 80 m/min from the standpoint of productivity and the standpoint of liquid crystal alignability. The laminate can be conveyed by use of various devices conventionally used for conveying films, and a conveying method is not particularly limited.

Here, the alignment film can be fabricated by applying a coating solution for which a material such as polyvinyl alcohol as described above is dissolved in water and/or an organic solvent or the like to the surface of the second optical anisotropic layer and drying the same. The alignment film can be fabricated before the above series of steps, and the alignment film may be continuously fabricated on the surface of the long second optical anisotropic layer being conveyed.

[Step (2)]

In the above step (2), a coating solution containing a liquid crystal compound is applied to the rubbed surface. An organic solvent is preferably used as a solvent used for preparation of the coating solution for forming the first optical anisotropic layer.

Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination.

In order to fabricate a highly uniform first optical anisotropic layer, the coating solution has a surface tension of preferably 25 mN/m or less, and more preferably, 22 mN/m or less.

In order to realize this low surface tension, it is preferable to contain, in the coating solution for forming the first optical anisotropic layer, a surfactant or a fluorine compound, particularly, a fluorine-containing polymer such as a fluoroaliphatic group-containing copolymer including repeating units corresponding to a monomer in the following (i) and repeating units corresponding to a monomer in the following (ii).

(i) a fluoroaliphatic group-containing monomer expressed by the following general formula (4)

(ii) poly(oxyalkylene)acrylate and/or poly(oxyalkylene) methacrylate

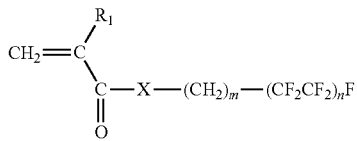

General Formula (4)

In the above general formula (4), $R^1$ represents a hydrogen atom or a methyl group, X represents an oxygen atom, a sulfur atom, or —N($R^2$)—, m represents an integer of 1 or more and 6 or less, and n represents an integer of 2 to 4. In addition, $R^2$ represents a hydrogen atom or an alkyl group with 1 to 4 carbon atoms.

The fluorine-containing polymer added into the coating solution for forming the first optical anisotropic layer has a weight average molecular weight of preferably 3,000 to 100,000, and more preferably, 6,000 to 80,000.

Furthermore, the amount of addition of the fluorine-containing polymer is preferably 0.005% by mass to 8% by mass, more preferably, 0.01% by mass to 1% by mass, and even more preferably, 0.05% by mass to 0.5% by mass, with respect to a coating composition (coating components other than the solvent) composed mainly of the liquid crystal compound.

When the amount of addition of the fluorine-containing polymer is less than 0.005% by mass, the effect is insufficient, and when this exceeds 8% by mass, the coated film can no longer be sufficiently dried or performance (for example, uniformity in retardation and the like) of the optical film is affected.

The coating solution can be applied to the rubbed surface according to a known method (e.g., a wire-bar coating method, an extrusion coating method, a direct gravure coating method, a reverse gravure coating method, or a die coating method). The amount of the applied solution is determined according to a desired thickness of the first optical anisotropic layer.

[Step (3)]

In the above step (3), the liquid crystal component is aligned at a temperature equal to or more than a liquid crystal transition temperature simultaneously with or after drying the applied coating solution, and its alignment is fixed to fabricate the first optical anisotropic layer. Heating at the time of drying or after drying can align the liquid crystal compound in a desired alignment.

The drying temperature can be determined in consideration of the boiling point of the solvent used for the coating solution and materials of the second optical anisotropic layer, the third optical anisotropic layer, and the alignment film. The aligning temperature of the liquid crystal compound can be determined according to the phase transition temperature from a liquid crystal phase to a solid phase of the liquid crystal compound to be used.

When a discotic liquid crystal compound is used as the liquid crystal compound, the aligning temperature is preferably 70° C. to 300° C., and more preferably, 70° C. to 170° C.

In addition, the viscosity in a liquid crystal state is preferably 10 cp to 10,000 cp, and more preferably, 100 cp to 1,000 cp.

If the viscosity is excessively low, the liquid crystal compound is so easily affected by blowing air at the time of alignment that the velocity and direction of blowing air must be very precisely controlled for continuous production. On the other hand, if the viscosity is excessively high, although not easily affected by blowing air, the liquid crystal is aligned so slowly that the productivity is considerably lowered.

The viscosity of the liquid crystal layer can be appropriately controlled by a molecular structure of the liquid crystal compound. In addition, preferably used is a method for adjusting the viscosity to a desired viscosity by adding the aforementioned additives (particularly, a cellulose-based polymer and the like) or a gelling agent by an appropriate amount.

The heating can be conduced by blowing warm air heated at a predetermined temperature or conveying in a heating chamber maintained at a predetermined temperature.

The velocity of the warm air at this time is preferably controlled in directions other than the rubbing direction to hit the liquid crystal compound layer. Also, in the following formula (3), V denotes a film-plane velocity (m/sec) of air blowing over the surface of the liquid crystal compound, and η denotes a viscosity (cp) of the liquid crystal compound layer at the aligning temperature of the liquid crystal compound.

$$0 < V < 5.0 \times 10^{-3} \times \eta \qquad \text{Formula (3)}$$

Furthermore, the aligned liquid crystal compound is fixed with its alignment state kept, whereby the first optical anisotropic layer is formed. Although the liquid crystal compound can be fixed by cooling to a solid phase transition temperature or by a polymerization reaction, this is preferably fixed by a polymerization reaction. The polymerization reaction includes a thermal polymerization reaction using a thermal polymerization initiator and a photopolymerization reaction using a photopolymerization initiator. A photopolymerization reaction is preferred.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketones (described in U.S. Pat. No. 3,549,367), acridine and phenazine compounds (described in JP-A No. 60-105667 and U.S. Pat. No. 4,239,850), and oxadiazole compounds (described in U.S. Pat. No. 4,212,970).

The using amount of the photopolymerization initiator is preferably in a range of 0.01% by mass to 20% by mass, and more preferably, in a range of 0.5% by mass to 5% by mass based on the solid content of the coating solution.

Light irradiation for promoting polymerization of the liquid crystal compound and fixing the same is preferably carried out with ultraviolet rays. The irradiation energy is preferably in a range of 20 mJ/cm$^2$ to 50 J/cm$^2$, more preferably, in a range of 20 mJ/cm$^2$ to 5,000 mJ/cm$^2$, and even more preferably, in a range of 100 mJ/cm$^2$ to 800 mJ/cm$^2$.

Also, the light irradiation may be carried out under a heating condition to accelerate the photopolymerization reaction. The light irradiation can be carried out by passing the second optical anisotropic layer applied with the coating solution for forming the first optical anisotropic layer and the third optical anisotropic layer through a conveying path with one or more light sources disposed at either upper and lower or left and right positions.

Prior to shifting to the above step (4), a protective layer can be formed on the first optical anisotropic layer fabricated in the above step (3). For example, a protective layer film prepared in advance may be laminated continuously on the surface of the first optical anisotropic layer fabricated in a long shape.

In the above step (4), a long laminate formed with the first optical anisotropic layer is wound up. The laminate may be wound up by winding the second optical anisotropic layer having the first optical anisotropic layer and the third optical anisotropic layer conveyed continuously around a cylindrical core.

The optical film obtained in the above step (4) is in a roll form, and hence is easily handled even when this is mass-produced. In addition, the rolled film can be stored or conveyed as it is.

The various conditions and the devices described in JP-A No. 09-73081 can be applied to various conditions of the respective steps of the manufacturing method of the present invention and details of usable devices.

(Polarizing Plate)

A polarizing plate of the present invention is formed by forming a first polarizing plate by laminating the third optical anisotropic layer on a polarizer, forming a first optical anisotropic layer laminate by laminating the first optical anisotropic layer on the second optical anisotropic layer, and joining the first polarizing plate and the first optical anisotropic layer laminate via an adhesive so that the third optical anisotropic layer and the second optical anisotropic layer are opposed to each other.

Also, the polarizing plate may be formed by cutting into a desired shape such as a rectangular shape and then adhering the aforementioned optical film to the polarizer or may be formed by adhering to a long polarizer and then cutting into a desired shape.

The polarizing plate not only has a polarizing function but also an excellent optical compensatory function and can moreover be easily incorporated in a liquid crystal display. Moreover, using the optical film as a protective film of a polarizer also contributes to a thinner profile of the liquid crystal display.

<Polarizer>

As the polarizer, preferred is a coating-type polarizer represented by Optiva Inc. or a polarizer composed of a binder and either iodine or a dichroic dye.

The iodine and dichroic dye express polarizing performance when these are aligned in the binder. The iodine and dichroic dye are preferably aligned along the binder molecules, or otherwise the dichroic dye is preferably aligned in one direction through self-organization as in liquid crystals.

Currently commercially available polarizers are generally fabricated by immersing a stretched polymer in a bath of an iodine or dichroic dye solution so that the iodine or dichroic dye penetrates into the binder.

Moreover, in a commercially available polarizer, the iodine or dichroic dye is distributed within approximately 4 μm from each polymer surface (approximately 8 μm in total of both sides), and in order to obtain sufficient polarizing performance, the thickness of at least 10 μm is necessary. The degree of penetration can be controlled by adjusting the concentration of an iodine or dichroic dye solution, the temperature of a bath of the same, and the time for immersing the same.

Accordingly, as mentioned above, the lower limit of the binder thickness is preferably 10 μm. From the standpoint of a light leaking phenomenon that occurs when the polarizing plate is used for a liquid crystal display, the thinner the upper limit of the thickness, the more preferable. The thickness is preferably equal to or smaller than that of a currently commercially available polarizing plate (approximately 30 μm), the thickness is preferably 25 μm or less, and more preferably, 20 μm or less. At 20 μm or less, a light leaking phenomenon is no longer observed in a 17-inch liquid crystal display.

The binder of the polarizer may be crosslinked. As the binder of the polarizer, a self-crosslinkable polymer may be used. The polarizer can be formed such that a polymer having functional groups or a polymer prepared by introducing functional groups to a polymer is crosslinked between polymer particles by a reaction of the functional groups under light, heat, or a pH variation.

In addition, a crosslinked structure may be introduced to the polymer by a crosslinking agent. The polarizer can be formed by using the crosslinking agent being a high-reactive compound to introduce a linking group from the crosslinking agent to the binder and crosslinking the binder.

Crosslinking can be generally carried out by applying a coating solution containing a crosslinkable polymer or a mixture of a polymer and a crosslinking agent onto a support and then heating the same. The crosslinking treatment may be caused at any stage before a final polarizing plate is obtained since it is sufficient so long as durability can be secured at the stage of a final product.

As mentioned above, either a self-crosslinkable polymer or a polymer crosslinked by a crosslinking agent can be used as the binder of the polarizer.

Examples of the polymers include polymethyl methacrylate, polyacrylic acid, polymethacrylic acid, polystyrene, polyvinyl alcohol, modified polyvinyl alcohol, poly(N-methylolacrylamide), polyvinyl toluene, chlorosulfonated polyethylene, nitrocellulose, chlorinated polyolefin (e.g., polyvinyl chloride), polyester, polyimide, polyvinyl acetate, polyethylene, carboxymethylcellulose, polypropylene, polycarbonate, and copolymers thereof (e.g., an acrylic acid/methacrylic acid copolymer, a styrene/maleinimide copolymer, a styrene/vinyltoluene copolymer, a vinyl acetate/vinyl chloride copolymer, an ethylene/vinyl acetate copolymer). Silane-coupling agents may also be used as the polymer.

Preferred examples are water-soluble polymers (e.g., poly(N-methylolacrylamide), carboxymethylcellulose, gelatin, polyvinyl alcohol, and modified polyvinyl alcohol). Gelatin, polyvinyl alcohol, and modified polyvinyl alcohol are more preferable, and polyvinyl alcohol and modified polyvinyl alcohol are particularly preferable.

The degree of saponification of the polyvinyl alcohol and modified polyvinyl alcohol is preferably 70% to 100%, more preferably, 80% to 100%, and particularly preferably, 95% to 100%. The degree of polymerization of the polyvinyl alcohol is preferably 100 to 5,000.

The modified polyvinyl alcohol can be obtained by introducing a modifying group to polyvinyl alcohol by copolymerization, a chain transfer, or block polymerization.

Examples of the modifying group in the copolymerization include COONa, $Si(OH)_3$, $N(CH_3)_3.Cl$, $C_9H_{19}COO$, $SO_3$, Na, and $C_{12}H_{25}$. Examples of the modifying group in the chain transfer include COONa, SH, and $C_{12}H_{25}$.

The degree of polymerization of the modified polyvinyl alcohol is preferably 100 to 3,000. The modified polyvinyl alcohol has been described in JP-A Nos. 08-338913, 09-152509, and 09-316127.

In addition, unmodified and alkylthio-modified polyvinyl alcohols having degrees of saponification of 85% to 95% are particularly preferable.

Furthermore, two or more unmodified or modified polyvinyl alcohols may be used in combination.

Examples of the crosslinking agent described in the specification of U.S. Reissue Pat. No. RE 23,297 can be used for the present invention. Boron compounds (e.g., boric acid, borax) can also be used as the crosslinking agent.

The more the crosslinking agent is added to the binder, the more the moist heat resistance of the polarizer can be improved. However, if the crosslinking agent is added to the binder at 50% by mass or more, alignability of the iodine or dichroic dye is lowered. The amount of the crosslinking agent is preferably 0.1% by mass to 20% by mass, and more preferably, 0.5% by mass to 15% by mass with respect to the amount of the binder.

Even after the crosslinking reaction is completed, the binder contains unreacted crosslinking agent to some extent. However, the amount of the unreacted crosslinking agent remaining in the binder is preferably 1.0% by mass or less, and more preferably, 0.5% by mass or less.

If the binder contains the crosslinking agent in an amount of more than 1.0% by mass, a problem may arise in durability. That is, if the polarizer containing a large amount of remaining crosslinking agent is installed in a liquid crystal display and used for a long time or left under a high-temperature and high-humidity atmosphere for a long time, the degree of polarization can be lowered.

As the dichroic dye, an azo dye, a stilbene dye, a pyrazolone dye, a triphenylmethane dye, a quinoline dye, an oxazine dye, a thiazine dye, or an anthraquinone dye is used. The dichroic dye is preferably water soluble. The dichroic dye preferably has a hydrophilic substituent (e.g., a sulfo, amino, or hydroxyl group).

Examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37.

The dichroic dyes have been described in JP-A Nos. 01-161202, 01-172906, 01-172907, 01-183602, 01-248105, 01-265205, and 07-261024.

The dichroic dye is used as a free acid or a salt such as an alkali metal salt, an ammonium salt, or an amine salt. A polarizer having various hues can be produced by blending two or more dichroic dyes. A polarizer using a compound (dye) showing black when polarizing axes are perpendicularly crossed or a polarizer or polarizing plate for which various dichroic molecules are blended so as to show black is excellent in both single-plate transmittance and polarization ratio, and is thus preferred.

<<Polarizer Manufacturing Method>>

For a polarizer, it is preferable to stretch a binder in the longitudinal direction (MD direction) of a polarizer and then dye the binder with iodine or a dichroic dye.

In the case of a stretching method, the stretch ratio is preferably 2.5 to 30.0, and more preferably, 3.0 to 10.0. The stretching can be carried out by dry stretching in air.

In addition, wet stretching in a state submerged in water may also be carried out. The stretch ratio in dry stretching is preferably 2.5 to 5.0, while the stretch ratio of wet stretching is preferably 3.0 to 10.0.

The stretching step may be carried out in several steps. Dividing the stretching step into several steps allows stretching more uniformly even at a high stretching ratio.

Before being thus stretched, the binder may be slightly stretched laterally or longitudinally (to the extent that a shrinkage in the width direction is prevented). For the stretching, a tenter stretching of a biaxial stretching can be carried out in different steps at the left and right. The above biaxial stretching is the same as the stretching method carried out in a normal film formation.

On both surfaces of the polarizer, protective films are preferably disposed, and as the protective film on one of the surfaces, preferably used is a part of the roll-like optical film of the present invention.

For example, preferably laminated is the protective film, the polarizer, the third optical anisotropic layer, the second optical anisotropic layer, and the first optical anisotropic layer in this order, or the protective film, the polarizer, the third optical anisotropic layer, the second optical anisotropic layer, the alignment film, and the first optical anisotropic layer in this order.

However, without limitation to this structure, the polarizer and the front surface of the first optical anisotropic layer may be adhered. For this adhesion, an adhesive may be used, and for example, polyvinyl alcohol-based resins (including polyvinyl alcohols modified with an acetoacetyl group, a sulfonic acid group, a carboxyl group, or an oxyalkylene group) and aqueous boron compound solutions can be used as the adhesive. Among these, polyvinyl alcohol-based resins are preferred.

The thickness of an adhesive layer after being dried is preferably in a range of 0.01 μm to 10 μm, and particularly preferably, in a range of 0.05 μm to 5 μm.

Moreover, when the polarizing plate of the present invention is used for a liquid crystal display, it is preferable to install an anti-reflection layer on a viewer-side surface, and the anti-reflection layer may be used as a protective layer on the viewer side of the polarizer.

The anti-reflection layer preferably has an inner haze of 50% or more from the standpoint of preventing a change in hue depending on the viewing angle of the liquid crystal display. Preferred concrete examples of these types have been described in JP-A Nos. 2001-33783, 2001-343646, and 2002-328228.

The polarizer preferably has a high transmittance and preferably has a high degree of polarization in order to increase the contrast ratio of the liquid crystal display.

The transmittance of the polarizer of the present invention is preferably in a range of 30% to 50%, more preferably, in a range of 35% to 50%, and particularly preferably, in a range of 40% to 50% to light with a wavelength of 550 nm.

The degree of polarization is preferably in a range of 90% to 100%, more preferably, in a range of 95% to 100%, and particularly preferably, in a range of 99% to 100% to light with a wavelength of 550 nm.

(Liquid Crystal Display)

An optical film of the present invention or a polarizing plate using the optical film can be advantageously used for a liquid crystal display with which a black/white display is difficult unless an optical film is attached, such as a birefringence-mode liquid crystal display, in particular, a liquid crystal display employing an OCB method, an ECB-mode reflective liquid crystal display, and the like.

A transmissive liquid crystal display device includes a liquid crystal cell and two polarizing plates disposed on both sides thereof. The liquid crystal cell supports liquid crystals between two electrode substrates.

One optical film is disposed between the liquid crystal cell and one of the polarizing plates, or two optical films are disposed between the liquid crystal cell and both polarizing plates, respectively.

An OCB-mode liquid crystal cell is of a liquid crystal display using a bend alignment-mode liquid crystal cell where rod-shaped liquid crystalline molecules in upper and lower parts of the liquid crystal cell are aligned in substantially opposite directions (symmetrically), and such a liquid crystal display has been disclosed in U.S. Pat. Nos. 4,583,825 and 5,410,422. Since the rod-shaped liquid crystal molecules in the upper and lower parts of the liquid crystal cell are symmetrically aligned, the liquid crystal cell of the bend alignment mode has a self-compensatory function.

Therefore, this liquid crystal mode is referred to also as an OCB (Optically Compensatory Bend) liquid crystal mode. A liquid crystal display of the bend alignment mode has an advantage of a high response speed.

Moreover, the OCB method is preferably combined with a field sequential drive method since this is capable of a high-speed response drive.

The liquid crystal cell used for the liquid crystal display of the present invention preferably has a Δnd value of 800 or more and less than 1,200 in a state applied with no voltage (under an alignment state of the liquid crystal material in a liquid crystal cell A with no voltage applied to the liquid crystal layer).

As in the above, according to the present invention, a liquid crystal display can be provided, which is improved in transmittance by securing Rth of the optical film as a whole, without lowering manufacturability, with a simple configuration.

EXAMPLES

Hereinafter, examples of the present invention will be described, however, the present invention is by no means limited to the following examples.

Example 1

Fabrication of Third Optical Anisotropic Layer

<<Preparation of Cellulose Acetate Solution A>>

The following components were placed in a mixing tank and stirred while being heated to dissolve the respective components, whereby a cellulose acetate solution A was prepared.

[Cellulose Acetate Solution A Composition]
Cellulose acetate with a degree of acetylation of 60.9% . . . 100 parts by mass
Triphenyl phosphate . . . 7.8 parts by mass
Biphenyldiphenyl phosphate . . . 3.9 parts by mass
Methylene chloride . . . 300 parts by mass
Methanol . . . 45 parts by mass Four parts by mass of cellulose acetate (linters) with a degree of acetylation of 60.9%, 25 parts by mass of the following retardation increasing agent, 0.5 parts by mass of silica microparticles (average particle size: 20 nm), 80 parts by mass of methylene chloride, and 20 parts by mass of methanol were placed in another mixing tank and stirred while being heated, whereby a retardation increasing agent solution was prepared.

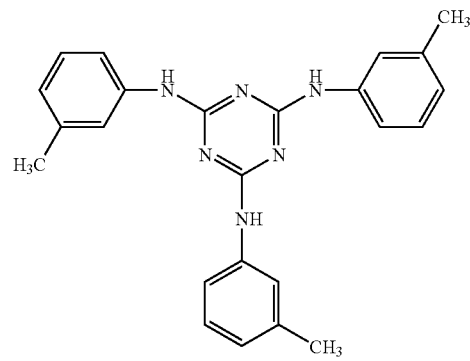

Retardation increasing agent 34.4 parts by mass of the above retardation increasing agent solution was mixed with 470 parts by mass of the above cellulose acetate solution A, and the mixture was sufficiently stirred to prepare a dope. The mass ratio of the retardation increasing agent to the cellulose acetate was 6.5%. A film with a residual solvent content of 35% parts by mass was peeled from a band, conveyed in an unstretched state by use of a film tenter at a temperature of 140° C., and then the film was dried at 130° C. for 45 seconds after removing a clip, whereby a third optical anisotropic layer in a film form was manufactured. The manufactured third optical anisotropic layer had a residual solvent content of 0.2% by mass and a film thickness of 92 µm.

<Measurement of Optical Characteristics>

The third optical anisotropic layer thus fabricated was measured with respect to an Re value by light with a wavelength of 550 nm by use of an automatic birefringence meter (KOBRA-21ADH manufactured by Oji Scientific Instruments Co., Ltd.). Furthermore, the Re values were measured at elevation angles of 40° and −40° using an in-plane slow axis as an elevation axis. The results are shown in Table 1.

The refractive index ny in the fast axis direction and refractive index nz in the thickness direction were calculated using parameters of the film thickness and refractive index nx in the slow axis direction so as to fit these measured values Re (550 nm), Re (40°), and Re (−40°), whereby the Rth value was determined. The results are shown in Table 1.

<Fabrication of Second Optical Anisotropic Layer>

<<Preparation of Cellulose Acetate Solution B>>

The following components were placed in a mixing tank and stirred while being heated to dissolve the respective components, whereby a cellulose acetate solution B was prepared.

[Cellulose Acetate Solution B Composition]
Cellulose acetate with a degree of acetylation of 60.9% . . . 100 parts by mass
Triphenyl phosphate . . . 7.8 parts by mass
Biphenyldiphenyl phosphate . . . 3.9 parts by mass
Methylene chloride . . . 300 parts by mass
Methanol . . . 45 parts by mass 18.5 parts by mass of the above retardation increasing agent solution was mixed with 470 parts by mass of the above cellulose acetate solution, and the mixture was sufficiently stirred to prepare a dope. The mass ratio of the retardation increasing agent to the cellulose acetate was 3.5%. A film with a residual solvent content of 35% parts by mass was peeled from a band, transversely stretched at a stretch ratio of 38% by use of a film tenter at a temperature of 140° C., and then the film was dried at 130° C. for 45 seconds after removing a clip, whereby a second optical anisotropic layer in a film form was manufactured. The manufactured cellulose acetate film had a residual solvent content of 0.2% by mass and a film thickness of 88 µm.

<Measurement of Optical Characteristics>

The second optical anisotropic layer thus fabricated was measured with respect to an Re value by light with a wavelength of 550 nm by use of an automatic birefringence meter (KOBRA-21ADH manufactured by Oji Scientific Instruments Co., Ltd.). Furthermore, the Re values were measured at elevation angles of 40° and −40° using an in-plane slow axis as an elevation axis. The results are shown in Table 1.

The refractive index ny in the fast axis direction and refractive index nz in the thickness direction were calculated using parameters of the film thickness and refractive index nx in the slow axis direction so as to fit these measured values Re (550 nm), Re (40°), and Re (−40°), whereby the Rth value was determined. The results are shown in Table 1.

<Saponification of Second Optical Anisotropic Layer>

An isopropyl alcohol solution of 1.5N potassium hydroxide was applied to one surface of the second optical anisotropic layer thus fabricated so that the amount became 25 ml/m², left at 25° C. for 5 seconds, and then washed with running water for 10 seconds, and the surface of the film was dried by blowing air at 25° C. Only the one surface of the second optical anisotropic layer was saponified in this manner.

<Formation of Alignment Film>

An alignment film coating solution having the following composition was applied to the saponified surface of the second optical anisotropic layer by a #14 wire bar coater at 24 ml/m². The surface was dried at 60° C. hot air for 60 seconds and further dried by 90° C. hot air for 150 seconds.

Then, the film thus formed was subjected to a rubbing treatment at an angle of 45° with respect to the stretching direction (almost coincident with the slow axis) of the second optical anisotropic layer.

[Composition of Alignment Film Coating Solution]
Following modified polyvinyl alcohol . . . 10 parts by mass
Water . . . 371 parts by mass
Methanol . . . 119 parts by mass
Glutaraldehyde (crosslinking agent) . . . 0.5 parts by mass

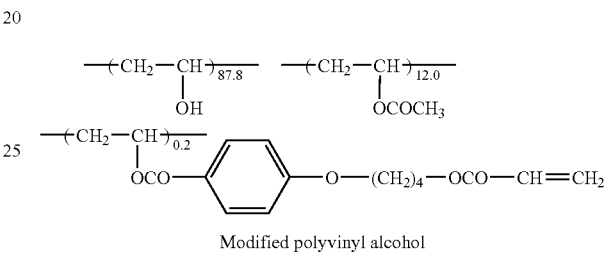

Modified polyvinyl alcohol

<Formation of First Optical Anisotropic Layer>

91 parts by mass of the following discotic compound, 9 parts by mass of ethylene oxide-modified trimethylolpropane triacrylate (V#360, manufactured by Osaka Organic Chemical Industry Ltd.), 0.5 parts by mass of cellulose acetate butyrate (CAB531-1, manufactured by Eastman Chemical Company), 3 parts by mass of a photopolymerization initiator (IRGACURE 907, manufactured by Ciba-Geigy Corporation), and 1 part by mass of a sensitizer (Kayacure DETX, manufactured by Nippon Kayaku Co., Ltd.) were dissolved in 204.0 parts by mass of methyl ethyl ketone to prepare a coating solution.

The coating solution was applied onto the alignment film by a #3.2 wire bar at 5.52 ml/m². This was adhered to a metal frame and heated for 2 minutes in a 130° C. constant temperature bath to align the discotic compound.

The laminate was then irradiated with ultraviolet rays at 90° C. for 4 minutes by using a 120-W/cm high-pressure mercury lamp to polymerize the discotic compound, and was then left to cool to room temperature. Thus the first optical anisotropic layer was formed to fabricate an optical film.

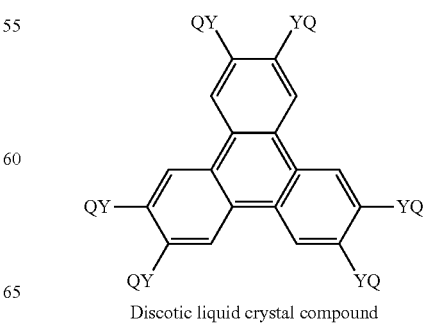

Discotic liquid crystal compound

-continued

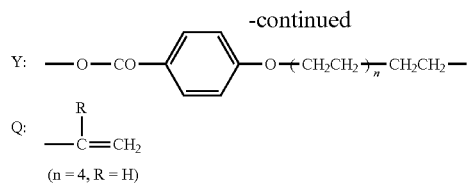

(n = 4, R = H)

The first optical anisotropic layer was measured with respect to an Re value by light with a wavelength of 550 nm by use of an automatic birefringence meter (KOBRA-21ADH manufactured by Oji Scientific Instruments Co., Ltd.).

Furthermore, the retardations Re (40) and Re (−40) were measured with an in-plane slow axis being elevated by 40° and −40° as elevation angles. The results are shown in Table 2.

(Fabrication of Elliptically Polarizing Plate)

Iodine was adsorbed onto a stretched polyvinyl alcohol film to fabricate a polarizing film. Then, the third optical anisotropic layer side of the optical film thus fabricated was adhered to one side of the polarizing film using a polyvinyl alcohol adhesive. These were disposed so that the slow axis of the third optical anisotropic layer was parallel to the transmission axis of the polarizing film.

A commercially available cellulose triacetate film (FUJITAC TD80UF manufactured by FUJIFILM Corporation) was subjected to a saponification treatment in the same manner as above, and adhered to the other side of the polarizing film (the side adhered with no optical film) by using a polyvinyl alcohol adhesive. An elliptically polarizing plate was produced in this manner.

(Fabrication of Bend-Alignment Liquid Crystal Cell)

A polyimide film was provided as an alignment film on a glass substrate having an ITO electrode, and then was subjected to a rubbing treatment. Two glass substrates thus obtained were made to face each other in such an arrangement that the rubbing directions became parallel, and the thickness of the liquid crystal cell was set to 7.2 µm. A liquid crystal compound having Δn of 0.1396 (ZLI1132, prepared by Merck KGaA) was injected into a space of the liquid crystal cell, whereby a bend-alignment liquid crystal cell A was fabricated.

(Fabrication of Liquid Crystal Display)

The bend-alignment liquid crystal cell A was combined with the above pair of polarizing plates to fabricate a liquid crystal display.

The liquid crystal cell A and the pair of polarizing plates were arranged so that the first optical anisotropic layer of the polarizing plate faces the substrate of the liquid crystal cell A, and the rubbing direction of the liquid crystal cell was anti-parallel to the rubbing direction of the first optical anisotropic layer opposed thereto.

The polarizing plates were adhered to separate transparent substrates at the viewer side and backlight side, respectively, so as to sandwich the fabricated liquid crystal cell A.

The liquid crystal cell A and the pair of polarizing plates were arranged so that the first optical anisotropic layer of the polarizing plates is opposed to the transparent substrate of the liquid crystal cell A, and the rubbing direction of the liquid crystal cell A was anti-parallel to the rubbing direction of the first optical anisotropic layer opposed thereto, whereby a liquid crystal display with a 20-inch liquid crystal cell A was fabricated.

<Evaluation of Liquid Crystal Display>

The fabricated liquid crystal display was evaluated with respect to the manufacturability, transmittance, contrast viewing angle, and durability (unevenness under high-temperature and high-humidity conditions).

<<Evaluation of Manufacturability>>

The fabricated liquid crystal display was evaluated with respect to the manufacturability based on the following evaluation criteria by use of a haze meter (NDH2000, manufactured by Nippon Denshoku Industries Co., Ltd.) The evaluation results are shown in Table 1.

[Evaluation Criteria]
A: Further lower haze
B: Low haze
C: Normal
D: High haze

<<Evaluation of Transmittance>>

The fabricated liquid crystal display was measured with respect to the luminance with and without a liquid crystal cell by use of a luminance meter (BM-5, TOPCON CORPORATION) and evaluated with respect to the transmittance. The evaluation results are shown in Table 1.

[Evaluation Criteria]
A: Brightest
B: Bright
C: Normal
D: Dark

<<Evaluation of Contrast Viewing Angle>>

In an environment of 25° C. and 60%, the fabricated liquid crystal display was disposed on a backlight, and voltage of a 55 Hz square wave was applied to the bend-alignment liquid crystal cell.

While the voltage is adjusted, a voltage at which the display showed the minimum black luminance (front luminance) was determined by use of a luminance meter (BM-5, manufactured by TOPCON CORPORATION).

Then, the black luminance and white luminance (front luminance) at the center of the display were measured similarly by use of the luminance meter TOPCON BM-5, whereby the contrast viewing angles were evaluated based on the following evaluation criteria. The results are shown in Table 1.

[Evaluation Criteria]
A: Best
B: Good
C: Normal
D: Bad

Example 2

A liquid crystal display of Example 2 was fabricated in the same manner as Example 1, except that the 0.5 parts by mass of cellulose acetate butyrate (CAB531-1, manufactured by Eastman Chemical Company) of the first optical anisotropic layer was changed to 1.0 part by mass, and was evaluated in the same manner as Example 1. The results are shown in Table 1.

Example 3

A liquid crystal display of Example 3 was fabricated in the same manner as Example 1, except that the 0.5 parts by mass of cellulose acetate butyrate (CAB531-1, manufactured by Eastman Chemical Company) of the first optical anisotropic layer was changed to 1.5 parts by mass, and was evaluated in the same manner as Example 1. The results are shown in Table 1.

Example 4

A liquid crystal display of Example 4 was fabricated in the same manner as Example 3, except that the discotic liquid crystal layer of the first optical anisotropic layer was changed to the following rod-shaped liquid crystal NG-1, and was evaluated in the same manner as Example 1. The results are shown in Table 1.

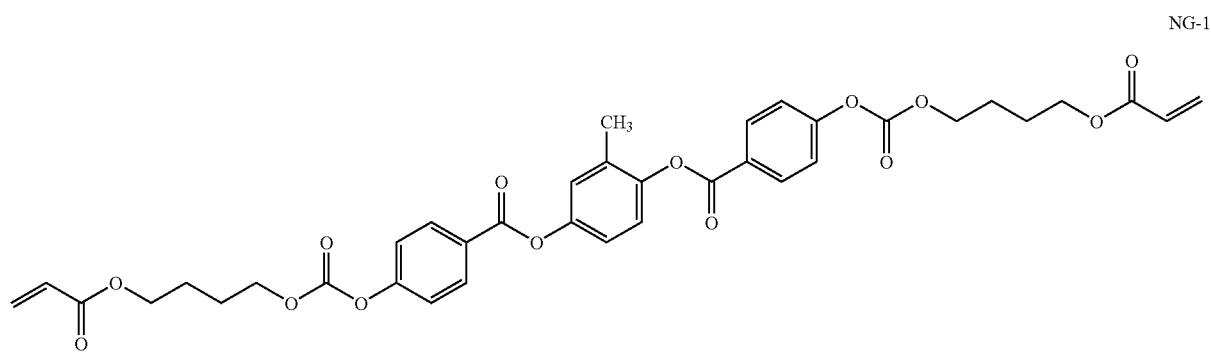

NG-1

Example 5

A liquid crystal display of Example 5 was fabricated in the same manner as Example 1, except that the second optical anisotropic layer was changed to a cycloolefin copolymer film (manufactured by Mitsui Chemicals, Inc., trade name: APEL) showing a roll form with a width of 1,340 mm and a corona discharge treatment was applied to one surface thereof, and was evaluated in the same manner as Example 1. The results are shown in Table 2.

Example 6

A liquid crystal display of Example 6 was fabricated in the same manner as Example 1, except that a norbornene film (manufactured by JSR Corporation, trade name: ARTON) showing a roll form with a width of 1,340 mm was used as the second optical anisotropic layer and a corona discharge treatment was applied to one surface thereof, and was evaluated in the same manner as Example 1. The results are shown in Table 2.

Example 7

A liquid crystal display of Example 7 was fabricated in the same manner as Example 3, except that the mass ratio 6.5% of the retardation increasing agent of the third optical anisotropic layer to cellulose acetate was changed to 3.3%, and was evaluated in the same manner as Example 1. The results are shown in Table 3.

Example 8

A liquid crystal display of Example 8 was fabricated in the same manner as Example 3, except that the mass ratio 6.5% of the retardation increasing agent of the third optical anisotropic layer to cellulose acetate was changed to 9.9%, and was evaluated in the same manner as Example 1. The results are shown in Table 3.

Comparative Example 1

A liquid crystal display of Comparative Example 1 was fabricated in the same manner as Example 1, except that the #3.2 wire bar of the first optical anisotropic layer was changed to a #2.1 wire bar, and was evaluated in the same manner as Example 1. The results are shown in Table 1.

Comparative Example 2

A liquid crystal display of Comparative Example 2 was fabricated in the same manner as Example 1, except that the 0.5 parts by mass of cellulose acetate butyrate (CAB531-1, manufactured by Eastman Chemical Company) of the first optical anisotropic layer was changed to 3.5 parts by mass, and was evaluated in the same manner as Example 1. The results are shown in Table 1.

Comparative Example 3

A liquid crystal display of Comparative Example 3 was fabricated in the same manner as Example 3, except that the third optical anisotropic layer was eliminated, and was evaluated in the same manner as Example 1. The results are shown in Table 2.

Comparative Example 4

A liquid crystal display of Comparative Example 4 was fabricated in the same manner as Example 3, except that the third optical anisotropic layer was eliminated and the mass ratio 3.2% of the retardation increasing agent of the second optical anisotropic layer to cellulose acetate was changed to 12.0%, and was evaluated in the same manner as Example 1. The results are shown in Table 2.

Comparative Example 5

A liquid crystal display of Comparative Example 5 was fabricated in the same manner as Example 1, except that the thickness 7.2 μm of the liquid crystal cell was changed to 5.0 μm, and was evaluated in the same manner as Example 1. The results are shown in Table 3.

Comparative Example 6

A liquid crystal display of Comparative Example 6 was fabricated in the same manner as Example 1, except that the thickness 7.2 μm of the liquid crystal cell was changed to 8.6 μm, and was evaluated in the same manner as Example 1. The results are shown in Table 3.

Comparative Example 7

A liquid crystal display of Comparative Example 7 was fabricated in the same manner as Example 7, except that the mass ratio 3.2% of the retardation increasing agent of the second optical anisotropic layer to cellulose acetate was changed to 1.6%, and was evaluated in the same manner as Example 1. The results are shown in Table 3.

Comparative Example 8

A liquid crystal display of Comparative Example 8 was fabricated in the same manner as Example 1, except that the mass ratio 3.2% of the retardation increasing agent of the second optical anisotropic layer to cellulose acetate was changed to 12.0% and the mass ratio 6.5% of the retardation increasing agent of the third optical anisotropic layer to cellulose acetate was changed to 19.8%, and was evaluated in the same manner as Example 1. The results are shown in Table 3.

TABLE 1

| | | Example 1 | Example 2 | Example 3 | Example 4 | Comparative Example 1 | Comparative Example 2 |
|---|---|---|---|---|---|---|---|
| First optical anisotropic layer | Composition member | Discotic liquid crystal | | | Rod-shaped liquid crystal | Discotic liquid crystal | |
| | $Re_1$ | 30 | 40 | 40 | 40 | 20 | 55 |
| | $Re_1(40)/Re_1(-40)$ | 5 | 10 | 15 | 15 | 5 | 25 |
| Second optical anisotropic layer | Composition member | TAC | TAC | TAC | TAC | TAC | TAC |
| | $Re_2$ | 40 | 40 | 40 | 40 | 40 | 40 |
| | $Rth_2$ | 200 | 200 | 200 | 200 | 200 | 200 |
| Third optical anisotropic layer | Composition member | TAC | TAC | TAC | TAC | TAC | TAC |
| | $Re_3$ | 0 | 0 | 0 | 0 | 0 | 0 |
| | $Rth_3$ | 150 | 150 | 150 | 150 | 150 | 150 |
| $Rth_2 + Rth_3$ | | 350 | 350 | 350 | 350 | 350 | 350 |
| $\Delta nd$ of liquid crystal cell | | 1,005 | 1,005 | 1,005 | 1,005 | 1,005 | 1,005 |
| Manufacturability | First optical anisotropic layer | B | B | B | B | B | B |
| | Second optical anisotropic layer | B | B | B | B | B | B |
| | Third optical anisotropic layer | B | B | B | B | B | B |
| Transmittance | | B | B | A | A | D | B |
| Viewing angle | | B | B | A | A | B | D |
| Durability | | C | C | C | C | C | C |

TABLE 2

| | | Example 5 | Example 6 | Comparative Example 3 | Comparative Example 4 |
|---|---|---|---|---|---|
| First optical anisotropic layer | Composition member | Discotic liquid crystal | | | |
| | $Re_1$ | 40 | 40 | 40 | 40 |
| | $Re_1(40)/Re_1(-40)$ | 15 | 15 | 15 | 15 |
| Second optical anisotropic layer | Composition member | COC | COP | TAC | TAC |
| | $Re_2$ | 40 | 40 | 40 | 40 |
| | $Rth_2$ | 150 | 250 | 200 | 350 |
| Third optical anisotropic layer | Composition member | TAC | TAC | — | — |
| | $Re_3$ | 0 | 0 | — | — |
| | $Rth_3$ | 150 | 150 | — | — |
| $Rth_2 + Rth_3$ | | 300 | 400 | 150 | 350 |
| $\Delta nd$ of liquid crystal cell | | 1,005 | 1,005 | 1,005 | 1,005 |
| Manufacturability | First optical anisotropic layer | B | B | B | B |
| | Second optical anisotropic layer | B | B | B | D (haze degradation) |

TABLE 2-continued

|  | | Example 5 | Example 6 | Comparative Example 3 | Comparative Example 4 |
|---|---|---|---|---|---|
| | Third optical anisotropic layer | B | B | — | — |
| Transmittance | | B | B | D | B |
| Viewing angle | | B | B | B | B |
| Durability | | B | B | C | C |

TABLE 3

| | | Example 7 | Example 8 | Comparative Example 5 | Comparative Example 6 | Comparative Example 7 | Comparative Example 8 |
|---|---|---|---|---|---|---|---|
| First optical anisotropic layer | Composition member | Discotic liquid crystal | | | | | |
| | $Re_1$ | 40 | 40 | 40 | 40 | 40 | 40 |
| | $Re_1(40)/Re_1(-40)$ | 15 | 15 | 15 | 15 | 15 | 15 |
| Second optical anisotropic layer | Composition member | TAC | TAC | TAC | TAC | TAC | TAC |
| | $Re_2$ | 40 | 40 | 40 | 40 | 40 | 40 |
| | $Rth_2$ | 200 | 200 | 200 | 200 | 100 | 350 |
| Third optical anisotropic layer | Composition member | TAC | COP | TAC | TAC | TAC | TAC |
| | $Re_3$ | 0 | 0 | 0 | 0 | 0 | 0 |
| | $Rth_3$ | 50 | 150 | 150 | 150 | 50 | 300 |
| $Rth_2 + Rth_3$ | | 250 | 350 | 350 | 350 | 150 | 650 |
| Δnd of liquid crystal cell | | 1,005 | 1,005 | 698 | 1,201 | 1,005 | 1,005 |
| Manufacturability | First optical anisotropic layer | B | B | B | B | B | B |
| | Second optical anisotropic layer | B | B | B | B | B | D |
| | Third optical anisotropic layer | B | B | B | B | B | C |
| Transmittance | | B | B | D | B | B | B |
| Viewing angle | | B | B | B | D | D | D |
| Durability | | C | B | C | C | C | C |

As shown in Tables 1 to 3, it could be recognized that the liquid crystal displays of Examples 1 to 8 that satisfy conditions (1) to (7) are high in manufacturability, high in transmittance, secured with appropriate viewing angles, and high in durability.

On the other hand, it could be recognized that, in Comparative Examples 1 to 2 where the optical characteristics of the first optical anisotropic layer do not satisfy the requirements of the present invention, the transmittance and viewing angle were evaluated to be unsatisfactory, in Comparative Examples 3 to 4 where the third optical anisotropic layer was not provided, the manufacturability and transmittance were evaluated to be unsatisfactory, in Comparative Examples 5 to 6 where a Δnd value of the liquid crystal cell does not satisfy the requirement of the present invention, the transmittance and viewing angle were evaluated to be unsatisfactory, and in Comparative Examples 7 to 8 where the sum of the retardation value $Rth_2$ in the thickness direction of the second optical anisotropic layer and the retardation value $Rth_3$ in the thickness direction of the third optical anisotropic layer does not satisfy the requirement of the present invention, the manufacturability and viewing angle were evaluated to be unsatisfactory.

Since the liquid crystal display of the present invention is high in manufacturability, secured with an appropriate viewing angle, high in durability, and particularly high in transmittance, this can be favorably applied to a car navigation system, an instrument panel, a rear-seat gaming application, a Head-Up Display, and the like.

What is claimed is:
1. A liquid crystal display comprising:
a liquid crystal cell comprising a pair of transparent substrates and a liquid crystal layer containing liquid crystal molecules, sandwiched between the pair of the transparent substrates; and
a polarizing plate, disposed on an outside of each transparent plate, and comprising at least a polarizer and an optical film comprising at least first, second and third optical anisotropic layers,
wherein the liquid crystal display device satisfies the following conditions (1) to (7):
(1) the liquid crystal cell having a Δnd value in the range of 800 or more and less than 1,200;
(2) the first optical anisotropic layer having a rubbing angle of 40° to 50° with respect to a transmission axis of the polarizing plate;
(3) the first optical anisotropic layer having an in-plane retardation value $Re_1$ of 25 nm or more and 50 nm or less at a wavelength of 550 nm, and the in-pate retardation value $Re_1$ being defined by the following numerical formula (I);

(4) within a plane including, of directions forming 45° with respect to a longitudinal direction of the first optical anisotropic layer, a direction where an in-plane refractive index is reduced and a normal line to the first optical anisotropic layer, a retardation value Re (40°) measured from a direction tilted by 40° in a plane direction of the first optical anisotropic layer from the normal line and a retardation value Re (−40°) measured from a direction tilted by 40° in reverse from the normal line satisfying the following numerical formula (II);

(5) the second optical anisotropic layer having an in-plane retardation value $Re_2$ in the range of −10 nm or more and 60 nm or less at a wavelength of 550 nm where the in-plate retardation value $Re_2$ being defined by the following numerical formula (I), and a retardation value $Rth_2$ in a thickness direction of the second optical anisotropic layer being in the range of 0 nm or more and 300 nm or less at a wavelength of 550 nm where the retardation value $Rth_2$ being defined by the following numerical formula (III);

(6) the third optical anisotropic layer has an in-plane retardation value $Re_3$ in the range of −10 nm or more and 60 nm or less at a wavelength of 550 nm where the in-pate retardation value $Re_3$ being defined by the following numerical formula (I), and a retardation value $Rth_3$ in a thickness direction of the third optical anisotropic layer being in the range of 25 nm or more and 300 nm or less at a wavelength of 550 nm where the retardation value $Rth_3$ being defined by the following numerical formula (III); and $$200(nm) \leq Rth_3 + Rth_3 \leq 600(nm), \qquad (7)$$

$$Re = (nx - ny) \times d \qquad \text{Numerical Formula (I)}$$

$$3 \leq Re(40°)/Re(-40°) \leq 20 \qquad \text{Numerical Formula (II)}$$

$$Rth = ((nx+ny)/2 - nz) \times d \qquad \text{Numerical Formula (III)}$$

wherein nx and ny denote refractive indexes in slow and fast axis directions in the plane of the first optical anisotropic layer, respectively, in the numerical formula (I), and nz denotes a refractive index in a film thickness direction, and d denotes a thickness in the numerical formula (III).

2. The liquid crystal display according to claim 1, wherein the polarizing plate comprises a first polarizing plate comprising the polarizer and the third optical anisotropic layer disposed on the polarizer, and a first optical anisotropic layer laminate comprising a laminate of the first optical anisotropic layer and the second optical anisotropic layer, and wherein the first polarizing plate and the first optical anisotropic layer laminate are bonded to each other by an adhesive so that the third optical anisotropic layer and the second optical anisotropic layer are faced to each other.

3. The liquid crystal display according to claim 2, wherein the polarizing plate is fabricated by adhering the first polarizing plate fabricated in a roll form and the first optical anisotropic layer laminate fabricated in a roll form by a roll to roll process.

4. The liquid crystal display according to claim 1, wherein at least either of the second optical anisotropic layer and the third optical anisotropic layer has a photoelastic coefficient of $10 \times 10^{-12}$ m$^2$/N or less.

5. The liquid crystal display according to claim 1, wherein the first optical anisotropic layer comprises at least one liquid crystal compound selected from a hybrid-aligned discotic liquid crystal and a hybrid-aligned rod-shaped liquid crystal in the film thickness direction.

6. The liquid crystal display according to claim 1, wherein the first optical anisotropic layer comprises an amorphous polymer, and the amorphous polymer is one selected from a group consisting of polyamide, polyimide, polyester, polyetherketone, polyamideimide, and polyesteramide.

7. The liquid crystal display according to claim 1, wherein at least either one of the second optical anisotropic layer and the third optical anisotropic layer is formed of a material comprising at least one selected from a cellulose triacetate resin (TAC), a cycloolefin copolymer (COC), and a cycloolefin polymer (COP).

8. The liquid crystal display according to claim 1, wherein the liquid crystal cell is of a bend alignment mode.

* * * * *